US007777920B2

(12) United States Patent
Shoda et al.

(10) Patent No.: US 7,777,920 B2
(45) Date of Patent: Aug. 17, 2010

(54) IMAGE COPIER AND IMAGE COPYING METHOD

(75) Inventors: Hirokazu Shoda, Kanagawa-ken (JP); Naoaki Ide, Shizuoka-ken (JP); Yusuke Hashizume, Chiba-ken (JP)

(73) Assignees: Toshiba Tec Kabushiki Kaisha, Tokyo (JP); Kabushiki Kaisha Toshiba, tokyo (JP)

( * ) Notice: Subject to any disclaimer, the term of this patent is extended or adjusted under 35 U.S.C. 154(b) by 1207 days.

(21) Appl. No.: 11/365,308

(22) Filed: Feb. 28, 2006

(65) Prior Publication Data

US 2007/0201105 A1    Aug. 30, 2007

(51) Int. Cl.
*H04N 1/38* (2006.01)
*H04N 1/04* (2006.01)

(52) U.S. Cl. .................. 358/474; 358/463; 358/464

(58) Field of Classification Search .......... 382/254, 382/274; 358/509, 510, 449, 513, 452, 463, 358/475, 480; 399/4, 16, 17, 363; 355/67, 355/70, 83

See application file for complete search history.

(56) References Cited

U.S. PATENT DOCUMENTS

| | | | | |
|---|---|---|---|---|
| 4,338,020 A * | 7/1982 | Yukawa et al. | ............... | 355/41 |
| 4,511,246 A * | 4/1985 | Nishiyama | ................... | 355/75 |
| 5,781,311 A * | 7/1998 | Inoue et al. | ................. | 358/475 |
| 5,848,789 A * | 12/1998 | Ochi et al. | ............ | 271/258.01 |
| 5,973,797 A * | 10/1999 | Tanaka et al. | ............... | 358/488 |
| 6,038,028 A * | 3/2000 | Grann et al. | ................ | 356/630 |
| 6,053,495 A * | 4/2000 | Hara et al. | .................. | 271/263 |
| 6,105,959 A * | 8/2000 | Miyata et al. | ............... | 271/263 |
| 6,388,452 B1 * | 5/2002 | Picciotto | ..................... | 324/663 |
| 7,062,214 B2 * | 6/2006 | Moriyama | ................... | 399/382 |

(Continued)

FOREIGN PATENT DOCUMENTS

JP    60-8835    1/1985

(Continued)

*Primary Examiner*—Jerome Grant, II
(74) *Attorney, Agent, or Firm*—Patterson & Sheridan, LLP

(57) ABSTRACT

An image copier according to the invention comprises a scanner for reading an image and a printer for forming an image on sheet, and the scanner includes a document table for positioning an original document from which an image is to be read; a document holding cover holding the original document on the original document table and having a light-emitting element for detecting the size of an original document which emits light when the size of the original document is detected, a light source for irradiating the original document with light when an image on the original document is read, a light-receiving element for image reading which receives reflected light from the original document, a controller for the light-emitting element for detecting the size of an original document which controls the light-emitting element for detecting the thickness of the original document, a specific region determination unit for identifying a specific region based on the numbers of pixels in a main scanning direction and a sub scanning direction of image data, and a background correction unit for performing a process of correcting the background of an image which has been read. In the image copier according to the invention, see-through copying of the bottom side can be suppressed by performing a background correction process after an image is read without blocking a sensor hole of a sensor for detecting the size of the original document from light.

25 Claims, 15 Drawing Sheets

U.S. PATENT DOCUMENTS

| | | | |
|---|---|---|---|
| 7,206,104 B2 * | 4/2007 | Lee | 358/488 |
| 7,243,045 B2 * | 7/2007 | Uwatoko et al. | 702/183 |
| 7,281,707 B2 * | 10/2007 | Moriyama et al. | 270/58.04 |
| 7,413,177 B2 * | 8/2008 | Mori et al. | 270/58.09 |
| 7,423,784 B2 * | 9/2008 | Tanabe et al. | 358/461 |
| 7,505,183 B2 * | 3/2009 | Kuo et al. | 358/487 |
| 7,547,242 B2 * | 6/2009 | Hirokawa et al. | 451/6 |
| 7,553,400 B2 * | 6/2009 | Nagai et al. | 205/93 |
| 2004/0181309 A1 * | 9/2004 | Matsumoto et al. | 700/223 |

FOREIGN PATENT DOCUMENTS

| | | | |
|---|---|---|---|
| JP | 02001139189 | * | 5/2001 |
| JP | 02002262029 | * | 9/2002 |
| JP | 02002300355 | * | 10/2002 |
| JP | 02006261847 | * | 9/2006 |
| JP | 02006275605 | * | 10/2006 |

* cited by examiner

IMAGE COPIER AND IMAGE COPYING METHOD

BACKGROUND OF THE INVENTION

1. Field of the Invention

The present invention relates to an image copier and an image copying method and, particularly, to an image copier and image copying method in which an image on an original document is read while suppressing the see-through copying of the bottom side without shielding a sensor hole of a sensor for detecting the document size from light.

2. Related Art

Japanese Patent Laid-Open "JP-A-60-8835" discloses a copier platen cover including a sensor for detecting the size of an original document provided in the platen cover.

In the copier platen cover disclosed in Japanese Patent Laid-Open "JP-A-60-8835", a sensor hole is provided on a surface thereof adjacent to a platen glass, and a shield plate is disposed inside the surface adjacent to the platen glass. The shield plate of the copier platen cover is slid during copying to shield the sensor hole.

However, in an image processing device utilizing the technique disclosed in Japanese Patent Laid-Open "JP-A-60-8835", a cost increase can result from the need for the shielding plate for shielding the sensor hole and a driver for sliding the shield plate.

Under the circumstance, there is demand for an image copier and an image copying method in which the see-through copying of the bottom side is suppressed without shielding a sensor hole of a document size detecting sensor from light.

SUMMARY OF THE INVENTION

The invention was made taking the above-described situation into consideration, and it is an object of the invention to provide an image copier and an image copying method in which the see-through copying of the bottom side is suppressed without shielding a sensor hole of a document size detecting sensor from light.

In order to solve the above-described problem, an image copier according to the invention comprises a scanner configured to read an image and a printer configured to form an image on sheet. The scanner includes a document table configured to position an original document from which an image is to be read, a document holding cover configured to hold the original document on the original document table and which has a light-emitting element for detecting the size of an original document which emits light when the size of the original document is detected, a light source configured to irradiate the original document with light when an image on the original document is read, a light-receiving element for image reading which receives reflected light from the original document, a controller for the light-emitting element for detecting the size of an original document which controls the light-emitting element for detecting the thickness of the original document, a specific region determination unit configured to identify a specific region based on the numbers of pixels in a main scanning direction and a sub scanning direction of image data, and a background correction unit configured to perform a process of correcting the background of an image which has been read.

In order to solve the above-described problem, an image copying method according to the invention includes the steps of reading an image from an original document and forming the image read at the image reading step. The image reading step includes the steps of selecting a parameter required for correcting an output value from a photoelectric element and correcting the output value from the photoelectric conversion element based on the parameter selected at the parameter selection step and a preset arithmetic expression.

Therefore, in the image copier and an image copying method according to the invention, the parameter for the background correction process is adjusted when image processing is performed after an image is read, which makes it possible to suppress the see-through copying of the bottom side without shielding the sensor hole of the original document size detection sensor.

DESCRIPTION OF THE DRAWINGS

In the accompanying drawings.

DETAILED DESCRIPTION OF THE INVENTION

Embodiments of an image processing apparatus and an image processing method according to the invention will now be described with reference to the accompanying drawings.

It should be noted that upward, downward, leftward, and rightward directions in the specification are used with reference to a normal usage state of an apparatus unless otherwise specified.

First Embodiment

Figure 1:
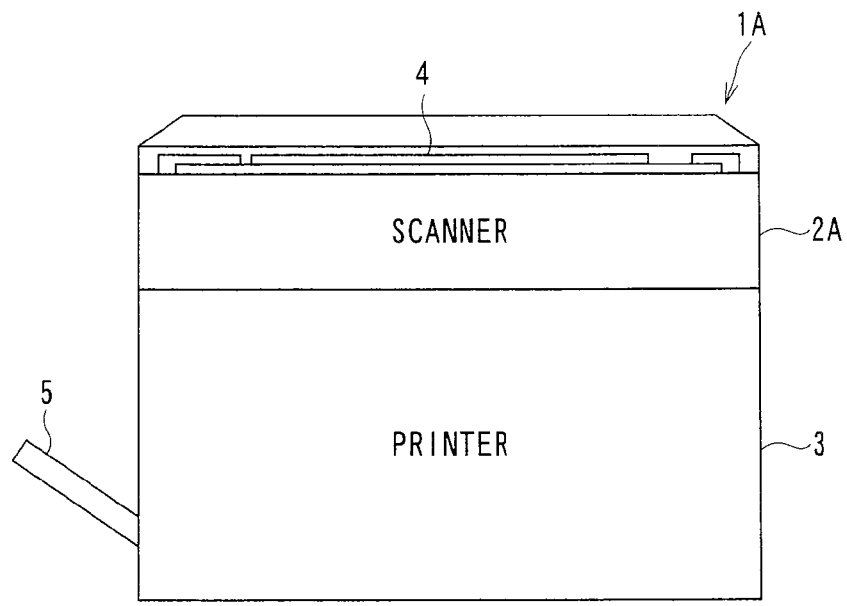
FIG. 1 is a schematic illustration of a configuration of an image copier according to a first embodiment of the invention.

FIG. 1 is a schematic illustration of a configuration of an image copier 1A which is an example of an image copier according to a first embodiment of the invention.

The image copier 1A includes a scanner 2A for reading an image, and a printer 3 for forming the image and printing the formed image on a sheet.

The scanner 2A reads an original document 4 positioned to read the image. In the case where the read image is formed, the scanner 2A transmits the information of the read image to the printer 3.

The printer 3 forms the image on a sheet based on the information of the image to be formed, and then prints out the sheet on which the image has been formed to a sheet discharge tray 5.

Figure 9:
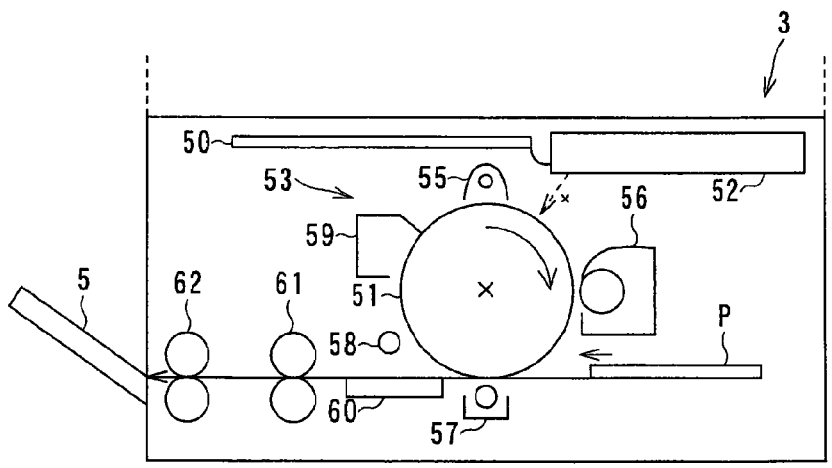
FIG. 9 is a schematic illustration of a printer of the image copier according to the first embodiment of the invention.
Figure 10:
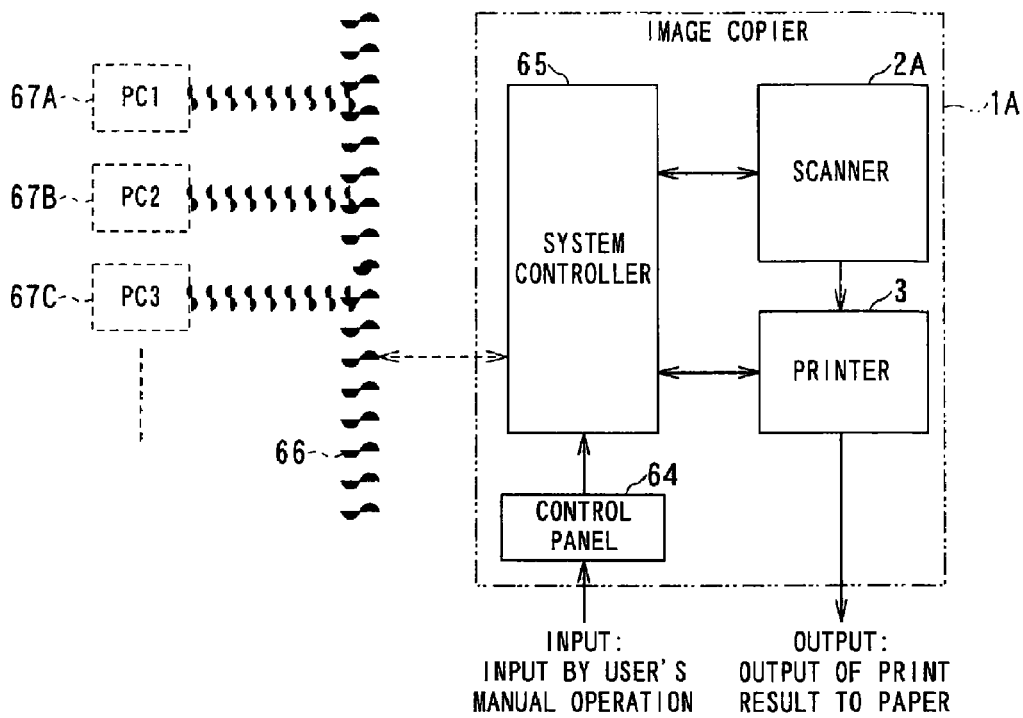
FIG. 10 is an illustration of an application of the image copier according to the first embodiment of the invention for explaining a situation in which it is used as a copier.
Figure 11:
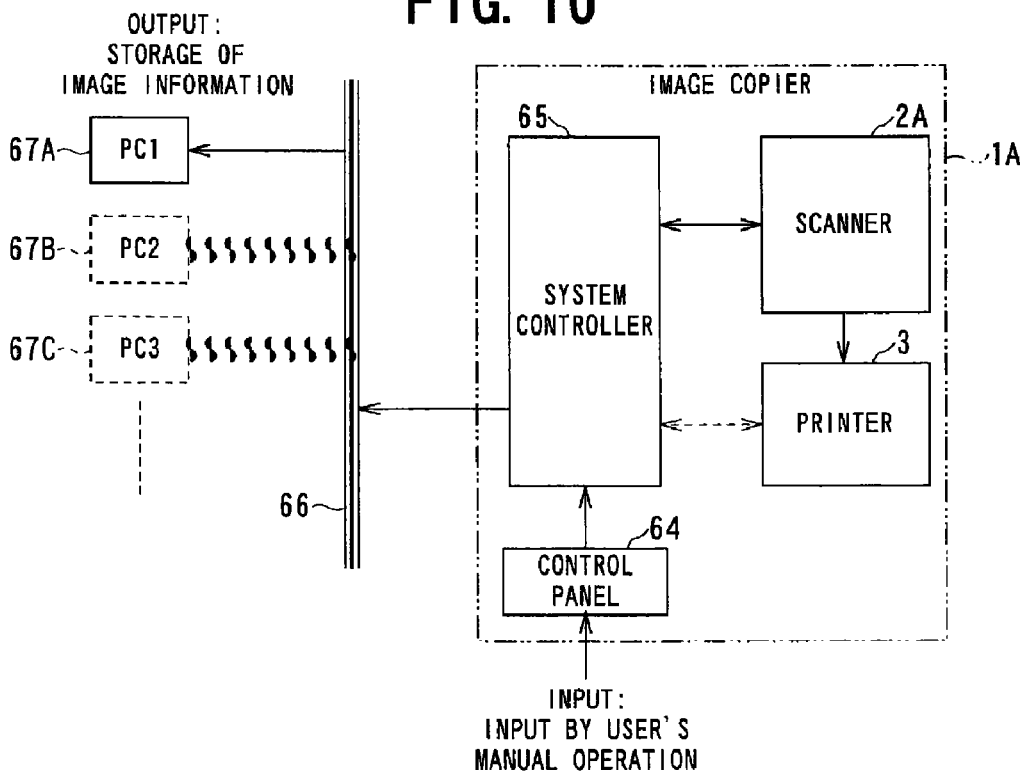
FIG. 11 is an illustration of an application of the image copier according to the first embodiment of the invention for explaining a situation in which it is used as a network printer.

Incidentally, although the image copier 1A further includes a system controller to perform a control and a control panel as a user interface, they are omitted in FIG. 1 (see FIG. 9 to FIG. 11).

Further, there is also a case where the scanner 2A does not transmit the read image information to the printer 3, but transmits it to a not-shown recording device or the like.

Furthermore, there is also a case where the information of the image to be formed by the printer 3 is received from a not-shown device other than the scanner 2A or is stored in the printer 3.

Next, the structure and operation of the scanner 2A in the image copier 1A will be described.

Figure 2:
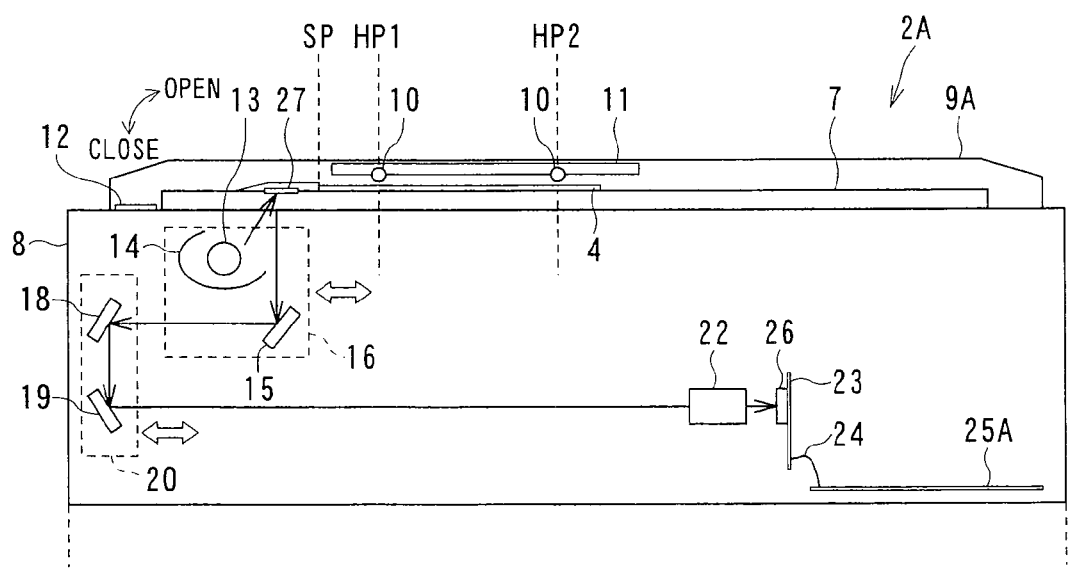
FIG. 2 is a schematic illustration of a configuration of a scanner of the image copier according to the first embodiment of the invention.

FIG. 2 is a schematic illustration of a configuration of the scanner 2A of the image copier 1A.

Note that FIG. 2 is a view of the image copier 1A with an original document 4 from which an image is to be read set therein.

The document table glass 7 is provided on an upper surface of the casing 8. At the time of image read, the read surface of the document 4 as the image read object points downward, and is positioned on the document table glass 7.

The document holding cover 9A is fixed to the casing 8 at its end so as to be openable and closable, and presses the document 4 positioned on the document table glass 7 onto the document table glass 7 by closing the document holding cover 9A. Besides, a plurality of LEDs (Light Emitting Diodes) 10, which are document size detecting light emitting elements to irradiate light to the document 4 when the size of document 4 is detected, are arranged on the document holding cover 9A.

Besides, a cover opening/closing detection sensor 12 to detect the opening/closing state of the document holding cover 9A is provided in the casing 8.

On the other hand, inside the casing 8, there are provided a light source 13, a first carriage 16 having a reflector 14 and a first mirror 15, a second carriage 20 having a second mirror 18 and a third mirror 19, a collective lens 22, a CCD (Charge Coupled Device) sensor board 23 as an optical/electrical conversion device, and a control board 25A as a scanner controller electrically connected to the CCD sensor board 23 through an electric connector such as, for example, a harness 24.

Note that reference character SP in FIG. 2 represents a position in which reading of an original document 4 is started when an image reading process is executed. Further, HP1 and HP2 represent a first home position and a second home position which are positions that the first carriage 16 can assume when the size of an original document is detected. Details of the original document size detection process will be described later.

When an image is read by the scanner 2A having such a configuration, light from the light source 13 is irradiated to the original document 4, and is reflected by the original document 4. The reflected light from the original document 4 passes through the first mirror 15, the second mirror 18, the third mirror 19, and the collective lens 22 to form an image on a sensor surface of a CCD line sensor 26 mounted on the CCD sensor board 23.

The first carriage 16 and the second carriage 20 can be driven for movement by a motor which is not shown in FIG. 2. The light irradiated by the light source 13 is scanned as a result of the movement of the first carriage 16 and the second carriage 20. In the image copier 1A, the optical path length from the original document 4 up to the CCD line sensor 26 is controlled to be constant by setting the moving speed of the first carriage 16 at twice the moving speed of the second carriage 20.

For example, the CCD line sensor 26 is a three-line CCD sensor for red (hereinafter represented by "R"), green (hereinafter represented by "G") and blue (hereinafter represented by "B"). The CCD line sensor 26 sequentially reads each line of the original document 4 placed on the original document table glass 7 and converts it into an analog electrical signal in accordance with the intensity of an optical signal that is reflected light from the same. The analog electrical signal as a result of the conversion is transmitted to the control board 25A connected to the CCD sensor board 23 through the harness 24.

The control board 25A converts the analog electrical signal thus received into a digital signal. Then, the control board 25A performs digital signal processing including a shading (distortion) correction for correcting a low-frequency distortion attributable to the collective lens 22 and a high-frequency distortion generated by a variation of the sensitivity of the CCD line sensor 26.

A signal to serve as a reference for black and a signal to serve as a reference for white are required to make a shading correction. The signal serving as a reference for black is a signal output by the CCD line sensor 26 when the light source 13 is off and the CCD line sensor is therefore irradiated with no light. The signal serving as a reference for white is a signal output by the CCD line sensor 26 when the light source 13 is on and reflected light from a white reference plate 27 is read. In general, when the signals to serve as references for black and white are generated, signals for a plurality of lines are averaged in order to reduce influences of singular points and quantization errors.

Note that the A/D (Analog to Digital) conversion process performed at the control board 25A may alternatively be performed at the CCD sensor board 23. Further, the CCD line sensor 26 may be a photoelectric element of a different type.

Figure 3:
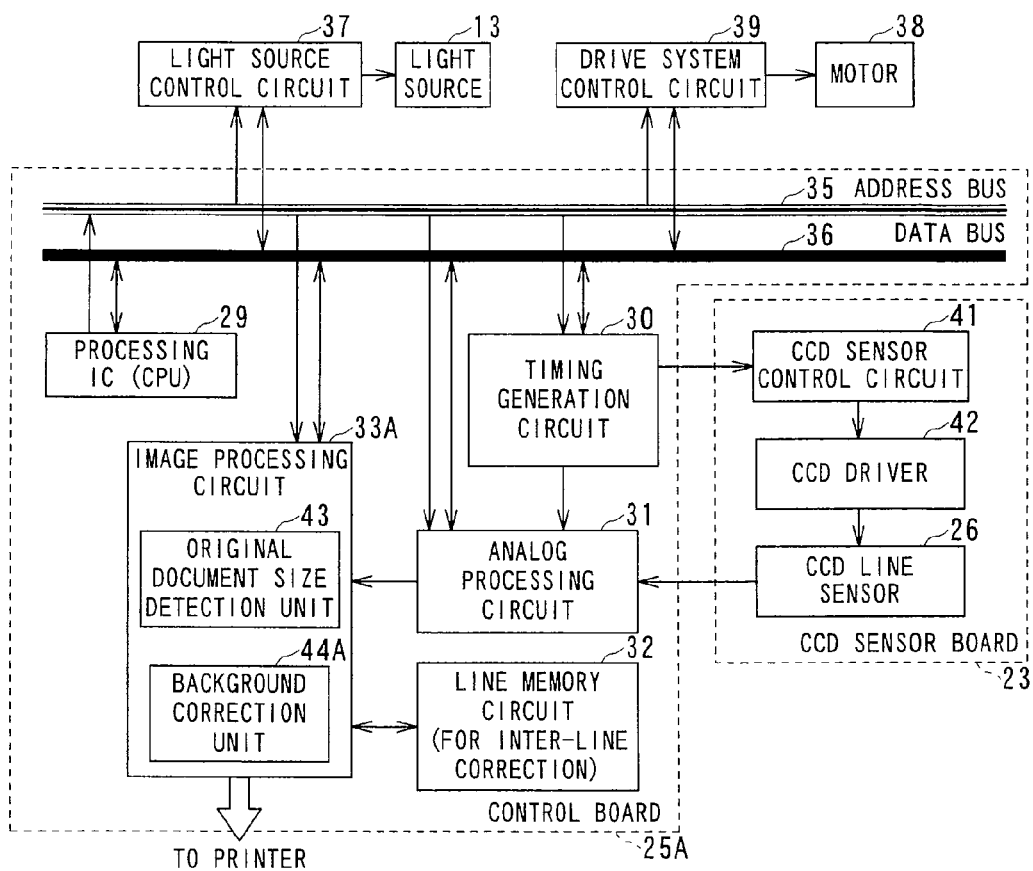
FIG. 3 is an illustration for explaining a schematic configuration of a scanner controller of the image copier according to the first embodiment of the invention and objects of control of the same.

FIG. 3 is an illustration for explaining a schematic configuration of the control board 25A and objects of control thereof.

The control board 25A includes a processing IC 29 such as a CPU, a timing generation circuit 30, an analog process circuit 31, a line memory circuit 32, and an image processing circuit 33A.

The processing IC 29 detects the open and closed states of the document holding cover 9A, controls the signal processing on the signals transmitted from the CCD line sensor 26, controls a light source control circuit 37 for controlling the light source 13 connected therewith through buses such as an address bus 35 and a data bus 36, and controls a driving system control circuit 39 for controlling a motor 38 for moving the first carriage 16 and the second carriage 20.

The timing generation circuit 30 generates a signal required for driving the CCD line sensor 26 and a signal required for analog processing performed by the analog process circuit 31.

The signal required for driving the CCD line sensor 26 generated by the timing generation circuit 30 is subjected to timing adjustment at a CCD sensor control circuit 41 mounted on the CCD sensor board 23 and transmitted to a CCD driver 42. The signal is subjected to signal amplitude level adjustment or waveform shaping at the CCD driver 42 and thereafter input to the CCD line sensor 26.

The signal required for the analog process is input to the analog process circuit 31 and transmitted to the image processing circuit 33A after being subjected to analog processing of various types at the analog process circuit 31.

The line memory circuit 32 corrects any positional deviation that occurs when each line sensor of the CCD line sensor 26 performs reading.

The image processing circuit 33A includes an original document size detection unit 43 for detecting the size of an original document and a background correction unit 44A for correcting the level of a CCD output signal in a specific region when an image is read (hereinafter referred to as a background correcting process).

The image processing circuit 33A controls the line memory circuit 32 and executes image processing such as a shading correction using the image signal which has been converted into a digital signal, an enlargement/reduction process, and a log transform, in addition to the original document size detection process performed by the original document size detection unit 43 and the background correction process performed by the background correction unit 44A.

The analog processing circuit 31 may be provided on the CCD sensor board 23, although it is provided on the control board 25A in FIG. 3. The CCD sensor control circuit 41 may be included in the timing generation circuit 30.

Next, a description will now be made on a configuration of the original document size detection unit 43 and an original document size detection method executed by the original document size detection unit 43.

As shown in FIG. 2, the original document size detection unit 43 determines the output levels of light radiated from the plurality of LEDs 10 provided in predetermined positions of the document holding cover 9A to detect the presence of an original document 4 on optical paths between the LEDs 10 and the CCD line sensor 26. The size of the original document 4 is determined based on the result of the detection of the original document 4.

Figure 4:
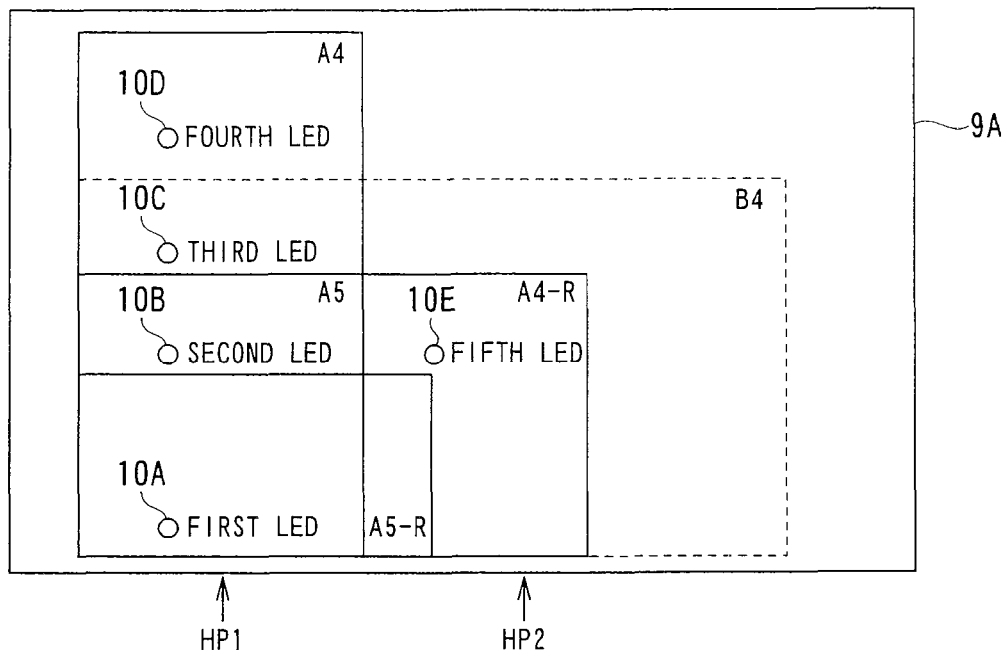
FIG. 4 is a plan view of an example of a document holding cover of the image copier according to the first embodiment of the invention (in which a corner thereof serves as a reference for positioning an original document) taken from the side of a document table glass.
Figure 5:
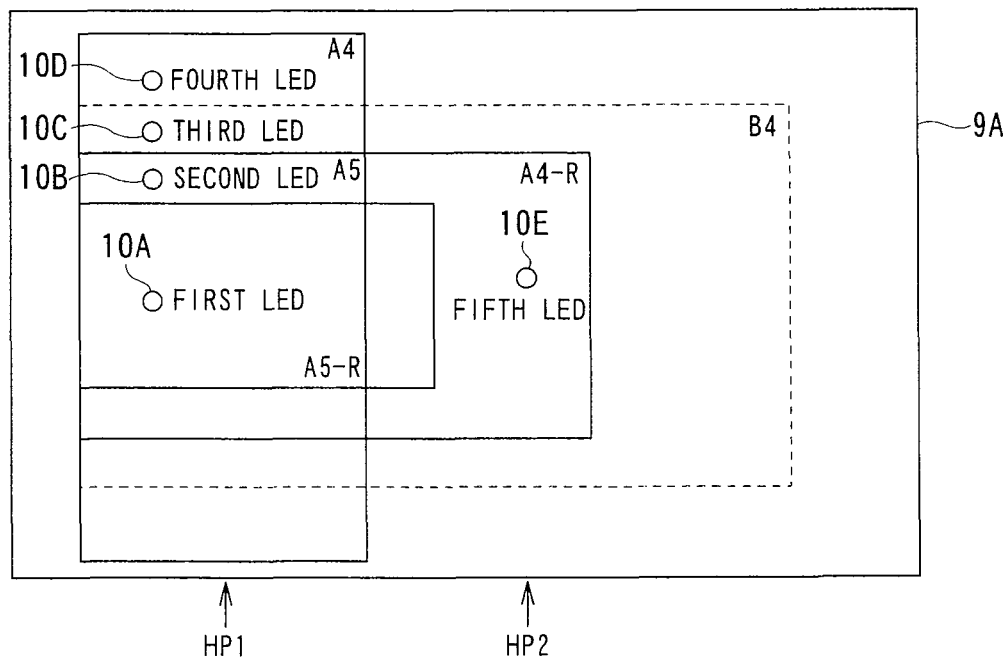
FIG. 5 is a plan view of another example of the document holding cover of the image copier according to the first embodiment of the invention (in which a central part thereof serves as a reference for positioning an original document) taken from the side of the original document table glass.

FIGS. 4 and 5 are plan views of the document holding cover 9A of the scanner 2A of the image copier 1A taken from the side of the original document table glass 7.

For example, five LEDs, i.e., a first LED 10A to a fifth LED 10E are provided on the document holding cover 9A shown in FIGS. 4 and 5. The first LED 10A to fifth LED 10E are provided appropriately depending on whether the positioning reference of the original document 4 is made the corner as shown in FIG. 4 or made the center as shown in FIG. 5. The LEDs are suitably provided also in consideration to which of the AB family or LT family the original document belongs to. The LEDs 10A to 10E are controlled by an LED controller 11 which is not shown in FIGS. 4 and 5.

Note that reference character HP1 and HP2 shown in FIGS. 4 and 5 represent the first home position and the second home position shown in FIG. 2. The first home position is an initial position that the first carriage 16 assumes when the size of an original document is detected. In the first home position, beams of light emitted by the first LED 10A to the fourth LED 10D are received by the CCD line sensor 26 via the first mirror 15, the second mirror 18, the third mirror 19, and the collective lens 22.

Further, the second home position is a position to which the first carriage 16 moves from the first home position during the detection of the size of a document to allow light emitted by the fifth LED 10E to be received by the CCD line sensor 26.

For convenience of description, the LEDs 10 provided on the document holding cover 9A will be described as being in accordance with the example shown in FIG. 4.

Figure 6:
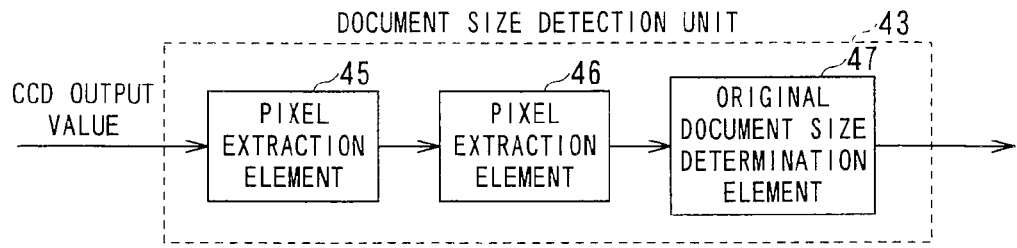
FIG. 6 is a schematic illustration of a configuration of an original document size detection unit of the image copier according to the first embodiment of the invention.

FIG. 6 is a schematic illustration of a configuration of the original document size detection unit 43.

The original document size detection unit 43 includes a pixel extraction element 45 for extracting the neighborhood of a pixel associated with the position where each of the LEDs 10A to 10E is provided, a threshold determination element 46 for determining the presence of an original document 4 based on the result of a comparison with a predetermined threshold, and an original document size determination element 47 for determining the size of the original document 4 which has been positioned based on the result of the determination made by the threshold determination element 46.

A CCD output signal obtained by receiving light emitted by each of the LEDs 10A to 10E with the CCD line sensor 26 is input to the original document size detection unit 43 after being subjected to signal processing of various types such as A-D conversion. After receiving the signal processing, the CCD output signal is input to the pixel extraction element 45.

The pixel extraction element 45 extracts a predetermined pixel associated with the position where each of the LEDs 10A to 10E is provided and pixels in the neighborhood of the same (hereinafter the pixels are referred to as a pixel group) from among pixels in the main scanning direction read by the CCD sensor 26.

For example, in case where the original document 4 is the A4 size document, the size of the same is 297 mm in the longitudinal direction thereof and 210 mm in the transverse direction thereof. When an original document reading operation is performed in the longitudinal direction as a main scanning direction and in the transverse direction as a sub scanning direction, the number of effective pixels of a photodiode array of the CCD line sensor 26 must be 7016 at least (4677 in the case of 400 dpi). In general, a sensor having 7500 pixels (5000 pixels in the case of 400 dpi) is employed.

For example, in the case where the number of effective pixels of the photodiode array of the CCD line sensor 26 is 7016 pixels, and the LEDs 10A to 10E are previously arranged at positions shown in FIG. 4, the output of the first LED 10A is the 500th pixel, the output of the second LED 10B and the fifth LED is the 3575th pixel, the output of the third LED 10C is the 5060th pixel, and the output of the fourth LED 10D is the 6175th pixel.

The pixel extraction elements 45 extract pixels in a specified range including the corresponding pixel, for example, five forward pixels and five backward pixels from each of the corresponding pixels. In the case where the range of pixels to be extracted is made to have five forward pixels and five backward pixels, the output of the first LED 10A is 495th to 505th pixels, the output of the second LED 10B and the fifth LED is 3570th to 3580th pixels, the output of the third LED 10C is 5055th to 5065th pixels, and the output of the fourth LED 10D is 6170th to 6180th pixels.

The pixel positions correspond to the respective document sizes (in the example shown in FIG. 4, A5-R, A5, A4-R, B4, A4). In the document holding cover 9A shown in FIG. 4, as an example, it is meant that the LEDs 10A to 10E are arranged outside the respective document sizes by +5 mm.

When the pixel extraction element 45 extracts the pixel group associated with the position of each of the LEDs 10A to 10E, it transmits a CCD output signal (0 to 255) for each pixel among the extracted pixel group to the threshold determination element 46.

At this time, the LEDs 10 are adjusted such that the level of a CCD output signal (hereinafter referred to as a CCD output value) is saturated (255) when there is no original document 4. A threshold for determining the presence of an original document 4 is a CCD output value obtained from transmission through a sheet having the lightest weight basis weight of 45 [g/m2] among sheets which are commonly used.

The threshold determination element 46 extracts the maximum value among the CCD output values of the eleven pixels extracted for each of the LEDs 10A to 10E. The maximum value is extracted for each of the positions where the LEDs 10A to 10E are provided. The extracted maximum value is compared with the predetermined threshold to determine whether each of the LEDs 10A to 10E has been shaded from light or to determine the presence of an original document 4. When the presence of an original document 4 is determined by the threshold determination element 46, information on the result of the determination is sent to the original document size determination element 47.

The concept of the threshold determination made by the threshold determination element 46 will now be described with reference to FIG. 7.

Figure 7:
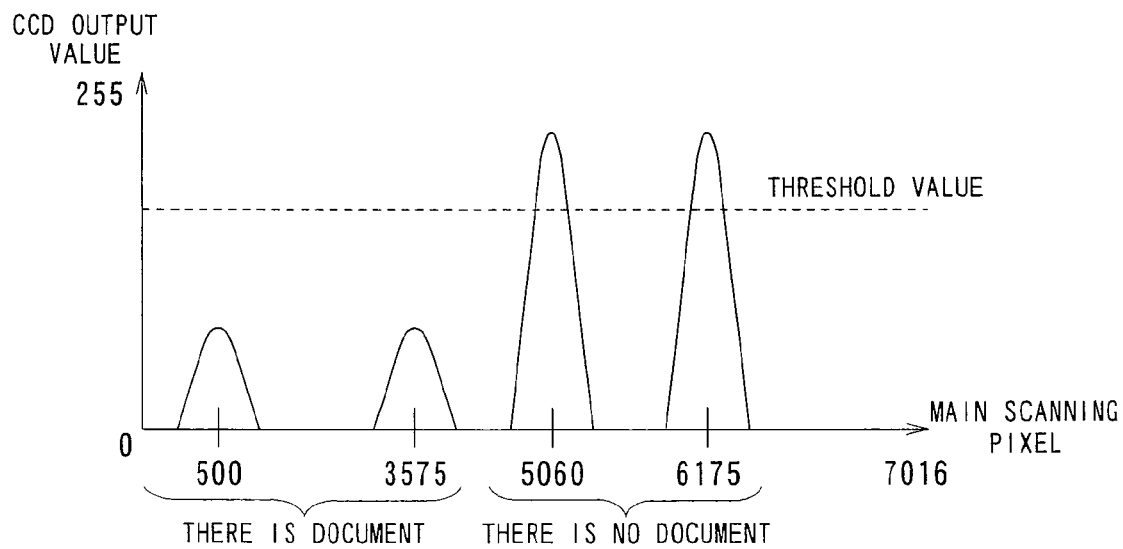
FIG. 7 is a graph for explaining the concept of threshold determination made by a threshold determination element of the image copier according to the first embodiment of the invention.

FIG. 7 is a graph for explaining the concept of the threshold determination made by the threshold determination element 46.

For example, threshold determination results as shown in FIG. 7 are obtained when an original document 4 of the A4-R size is placed with the LEDs 10A to 10E provided as shown in FIG. 4. When an A4-R original document 4 is placed, since the first LED 10A, the second LED 10B, and the fifth LED 10E are shaded from light, small values are output as the CCD output values of the first LED 10A, the second LED 10B, and the fifth LED 10E.

On the contrary, since the third LED 10C and the fourth LED 10D are not shaded from light, output values close to 255 are obtained as the CCD output values for the third LED 10C and the fourth LED 10D. Determination as thus described makes it possible to detect an LED 10 which is shaded from light.

The original document size determination element 47 shown in FIG. 6 determines the size of a document tabled on results of LED shading determination that it receives and information shown in Table 1 described below.

In the entry of each LED shown in Table 1, "ON" indicates the state in which the LED is shaded from light by an original document 4 (there is an original document), and "OFF" indicates that there is no original document (No Original). The symbol "–" means that the LED is ignored (Don't care).

TABLE 1

| 1st LED | 2nd LED | 3rd LED | 4th LED | 5th LED | Document Size |
|---------|---------|---------|---------|---------|---------------|
| OFF     | —       | —       | —       | —       | No Original   |
| ON      | OFF     | OFF     | OFF     | OFF     | A5-R          |
| ON      | ON      | OFF     | OFF     | OFF     | A5            |
| ON      | ON      | ON      | ON      | OFF     | A4            |
| ON      | ON      | OFF     | OFF     | ON      | A4-R          |
| ON      | ON      | ON      | OFF     | ON      | B4            |
| ON      | ON      | ON      | ON      | ON      | A3            |

As thus described, the original document size determination element 47 can determine the size of a document tabled on results of LED shading determination that it receives and information shown in Table 1 described below.

When the size of an original document is determined, the original document size determination element 47 sends information on the determination result to the processing IC 29 shown in FIG. 3. When a combination different from those shown in Table 1 occurs, the processing IC 29 determines that there is an original document having an irregular shape and requests the user to specify the size of the same through a user interface such as a control panel 64 (see FIGS. 10 to 12).

A description will now be made on a configuration of the background correction unit 44A and a background correcting method executed by the background correction unit 44A.

The background correction unit 44A suppresses the see-through copying of the bottom side or image noises attributable to the LEDs 10A to 10E provided on the document holding cover 9A.

The LEDs 10A to 10E are provided on the document holding cover 9A of the image copier 1A, and the document holding cover 9A is therefore provided with holes for setting the LEDs 10A to 10E (hereinafter referred to as LED setting holes). When an original document is read, the LED setting holes cast shadows which can generate noises on an image. Under the circumstance, in the image copier 1A, background processing is performed in locations where shadows were generated when an original document was read to suppress the see-through copying of the bottom side.

Figure 8:
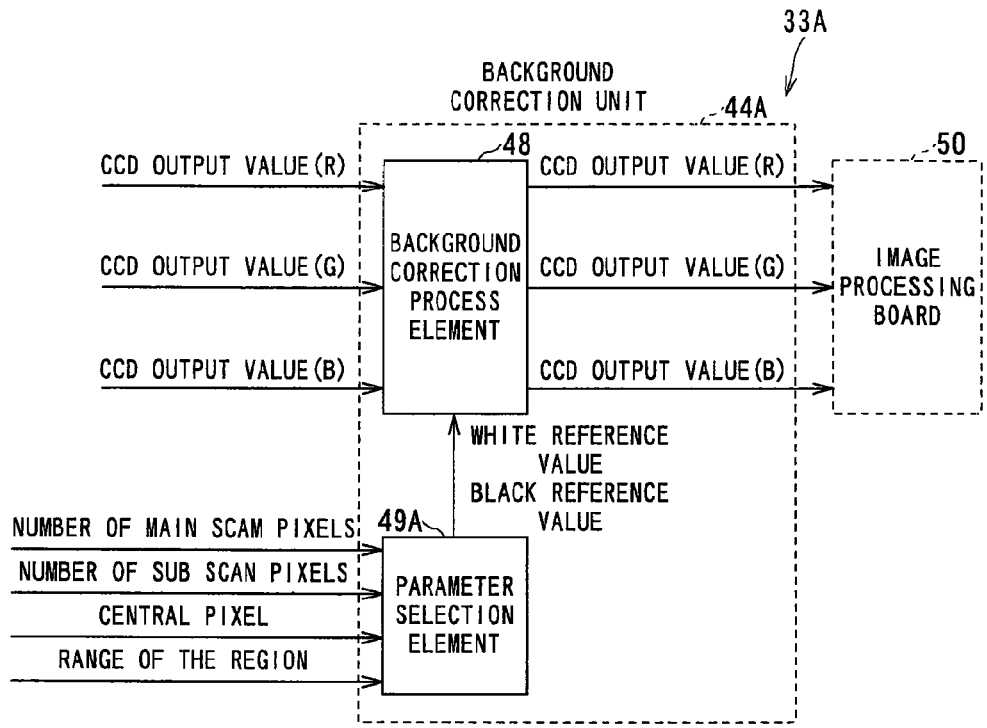
FIG. 8 is a schematic illustration of a background correction unit of the image copier according to the first embodiment of the invention.

FIG. 8 is a schematic illustration of a configuration of the background correction unit 44A.

The background correction unit 44A includes a background correction process element 48 for correcting each of CCD output values for R, G, and B in a specific region and a parameter selection element 49A for selecting parameters for the background correction process.

The background correction element 48 has information on Expression 1 shown below and performs calculations based on Expression 1 to correct a CCD output value for each of R, G, and B.

$$OUT_{img}=(IN_{img}-\text{black reference value})/(\text{white reference value}-\text{black reference value})\times 255 \quad \text{[Expression 1]}$$

where $OUT_{img}$ represents a CCD output value after a background correction process, and $IN_{img}$ represents an input CCD output value before the background correction process. The white reference value and the black reference value are some sorts of parameters input from the parameter selection element 49A. Examples of the white reference value and the black reference value are shown in Table 2 to be described later.

The parameter selection element 49A determines whether a background correction process is to be performed for a region based on the number of pixels in the main scanning direction and the number of pixels in the sub scanning direction or determines it as a specific region or a region other than the same.

For example, when an A4 original document is positioned with the document holding cover 9A shown in FIG. 4 to read an image from the same, the first LED 10A to the fourth LED 10D are present in an image reading region when the image is read. Then, it is necessary to suppress the see-through copying of the bottom side attributable to the first LED 10A to the fourth LED 10D.

In the case of the above example, the position where the fifth LED 10E is provided is treated as being out of a specific region because the LED is located outside the image reading region. That is, it is excluded from the object of a background correction process.

The LEDs 10 have a light-emitting surface having a size of about 1 mm which is approximately equivalent to a square of 24 pixels (24×24) when converted on a 600 dpi basis. The square of about 24 pixels (24×24) constitutes a central region.

Since the see-through copying of the bottom side occurs not only in the positions of the LED setting holes but also in the neighborhoods of the same, the background correction process must be performed also in the neighborhoods including the central regions. A region to serve as a reference for the correction of the see-through copying of the bottom side at the LED setting holes and the neighborhoods of the LED setting holes (hereinafter referred to as a reference region) has a size that is slightly greater the size of the light-emitting surface of an LED 10, e.g., a square of 31 pixels (31×31).

The central pixels of positions associated with the positions of the LEDs 10A to 10E can be identified, for example, using pixels in the main scanning direction (the vertical direction in FIGS. 4 and 5) and pixels in the sub scanning direction (the horizontal direction in FIGS. 4 and 5) when the positions of the LEDs 10A and 10E are determined in advance as shown in FIG. 4.

For example, the first LED 10A is at pixel 500th in the main scan and at pixel 500th in the sub scan; the second LED 10B is at pixel 3575th in the main scan and at pixel 500th in the sub scan; the third LED 10C is at pixel 5060th in the main scan and at pixel 500th in the sub scan; the fourth LED 10D is at pixel 6175th in the main scan and at pixel 500th in the sub scan; the fifth LED 10E is at pixel 3575th in the main scan and at pixel 5060th in the sub scan.

Information on the central pixels of the positions associated with the positions of the LEDs 10A to 10E and information on the range of a specific region is input (set) in advance as a sort of parameter.

When a region is determined as a specific region or a region other than the same, the parameter selection element 49A sends information on a white reference value and a black reference value in accordance with the result of the determination to the background correction process element 48. Examples of white reference values and black reference values suitable for a specific region and a region other than the same are shown in Table 2 below.

TABLE 2

| Region Type | White Reference Value | Black Reference Value |
| --- | --- | --- |
| Specific Region | 220 | 10 |
| Other Region | 240 | 10 |

By using white reference values and black reference values as shown in Table 2, in a specific region where the see-through copying of the bottom side (black) has occurred, the CCD output value is corrected to a greater value (which is closer to white than the value before correction) to eliminate the see-through copying of the bottom side. Then, CCD output values of R (red), G (green), and B (blue) after the background correction process are sent to an image processing board 50 provided downstream at which image processing such as color conversion, filtering, and gradation processing is performed as occasion demands.

A configuration and operations of the printer 3 of the image copier 1A will now be described.

FIG. 9 is a schematic illustration of a configuration of the printer 3. The printer 3 shown in FIG. 9 is described as an example of a configuration for generating a monochromatic image.

There is provided the image processing board 50 serving as an image processing unit for performing processes required for generating an image, e.g., a process of converting information read by the CCD line sensor 26 into a control signal for a light-emitting element such as a semiconductor laser which is not shown, a laser optical system unit 52 having the light-emitting element such as a semiconductor laser for generating a latent image on a photosensitive drum 51, and an image formation unit 53.

The image formation unit 53 includes the photosensitive drum 51 required for generating an image using an electrophotographic process, a charger 55, a developer 56, a transfer charger 57, a stripping charger 58, a cleaner 59, a sheet conveying mechanism 60 for conveying paper P, and a fuser 61. A sheet of paper P having an image formed thereon by the image forming unit 23 is output to the discharge tray 5 through a discharge roller 62 for discharging the paper P to the outside of the machine.

The image copier 1A having such a configuration may be used as an image copier which is enabled for an image copying operation, for example, by the system controller 65 controlling the scanner 2A and the printer 3 based on a user input from the control panel 64 as shown in FIG. 10.

Figure 12:
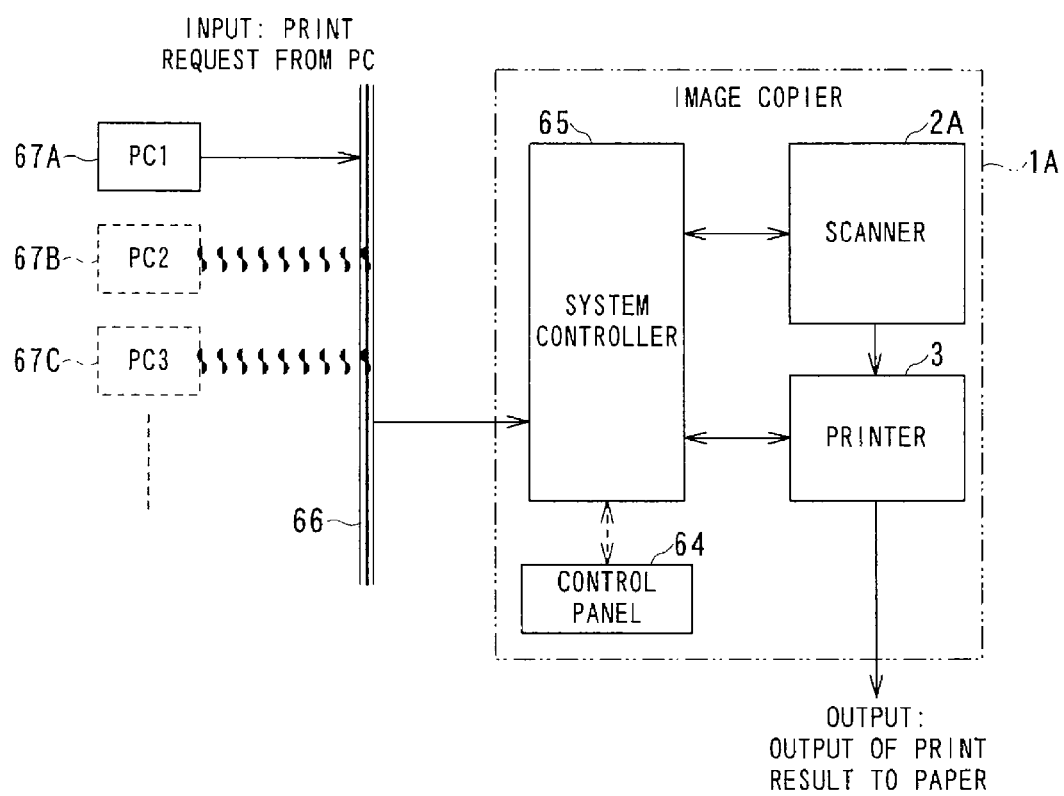
FIG. 12 is an illustration of an application of the image copier according to the first embodiment of the invention for explaining a situation in which it is used as a network scanner.

Alternatively, it may be used as a printer which performs a printing operation based on inputs from external computers (hereinafter referred to as a first PC 67A, a second PC 67B, a third PC 67C, and so on) connected through a network 66 as shown in FIG. 11 or a scanner for storing image information in any of the external computers (e.g., the first PC 67A) connected through the network 66 based on an user input from the control panel 64 as shown in FIG. 12.

An image copying method according to the first embodiment of the invention will now be described.

The image copying method according to the first embodiment of the invention comprises an original document size detecting step for detecting the size of an original document 4, a first image reading step for reading an image from the original document 4, and an image forming step for forming the image read at the first image reading step.

The image copying method according to the first embodiment of the invention is characterized by the original document size detecting step and the image reading step. Then, a description will be made on the original document size detecting step and the first image reading step of the image copying method according to the first embodiment of the invention.

Figure 13:
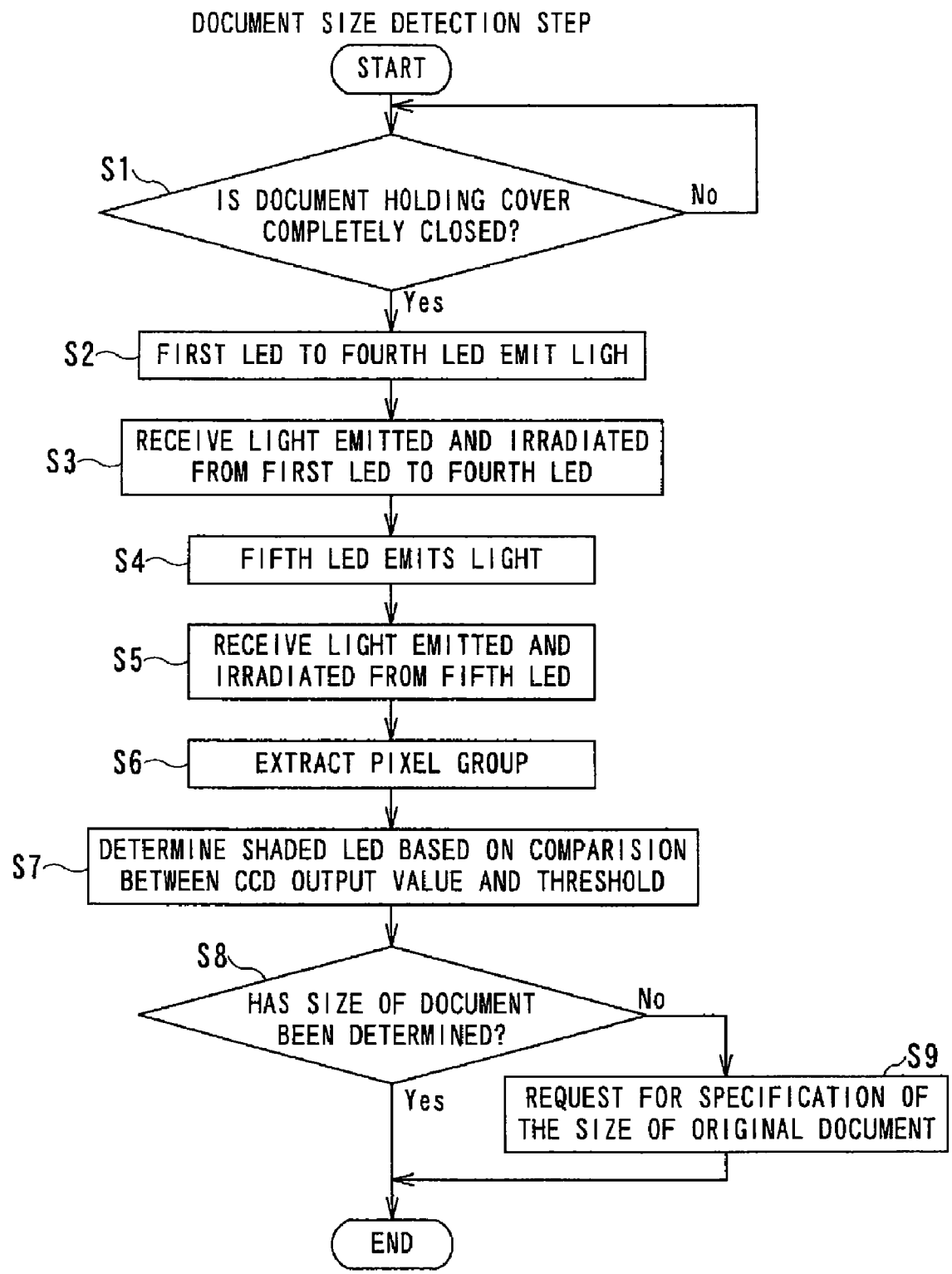
FIG. 13 is a flow chart for explaining an original document size detection step of an image copying method according to the first embodiment of the invention.

FIG. 13 is a flow chart for explaining the original document size detecting step of the image copying method according to the first embodiment of the invention.

The original document size detecting step is executed when a mode for automatically detecting the size of an original document 4 is selected.

The original document size detecting step includes a document holding cover closure confirmation step (step S1) for detecting whether the document holding cover 9A is closed or not to confirm that the document holding cover 9A is closed, original document size detection light-emitting element emission steps (step S2 and step S4) for causing the emission of the LEDs 10A to 10E as light emitting elements for detecting the size of an original document, radiated light receiving steps (step S3 and step S5) for receiving the light radiated by the LEDs 10A to 10E, a pixel group extraction step (step S6) for extracting a predetermined pixel group including a pixel associated with each of the LEDs 10A to 10E, a threshold determination step (step S7) for determining whether a CCD output value of the pixel group extracted at the pixel extraction step is in the excess of a preset threshold or not, an original document size determination step (step S8) for determining the size of the original document from which an image is to be read based on the result of the determination at the threshold determination step, and an original document size specification requesting step (step S9) for making a request for a specification of the size of the original document when the size of the original document 4 cannot be determined at the original document size determination step (in the case of NO at step S8).

At the original document size detection step, first, it is detected at step S1 whether the document holding cover 9A is completely closed or not. In case where the document holding cover 9A is completely closed (in the case of YES at step S1), the first LED 10A to the fourth LED 10D provided in positions associated with the first home position are made to emit light at step S2.

The light emitted by the first LED 10A to the fourth LED 10D is received by the CCD line sensor 26 through the first carriage 16 which has been waiting in the first home position, the second carriage 20, and the collective lens 22 (step S3). At step S3, the fifth LED 10E and the light source 13 are off.

The first carriage 16 then moves to the second home position, the fifth LED 10E provided in a position associated with the second home position emits light (step S4) when the movement terminates. The light emitted by the fifth LED 10E is received by the CCD line sensor 26 through the first carriage 16 which has been waiting in the second home position, the second carriage 20, and the collective lens 22 (step S5). At step S5, the first LED 10A to the fourth LED 10D and the light source 13 are off.

When the radiated light receiving steps (step S3 and step S5) terminate, the pixel extraction element 45 extracts predetermined pixel groups including the pixels associated with the LEDs 10 (step S6). The threshold determination element 46 determines whether each of the LEDs 10A to 10E has been shaded from light based on CCD output values of the extracted pixel groups (step S7). The original document size determination element 47 determines the size of the original document based on the result of the LED shading determination and the information shown in Table 1 (step S8).

When the size of the original document is successfully determined (in the case of YES at step S8), the original document size detection step is terminated (END).

When the document holding cover 9A is not completely closed (in the case of NO at step S1), the process waits until the document holding cover 9A is completely closed while repeating the process step at step S1.

When the size of the original document cannot be detected (in the case of NO at step S8), the user is requested to specify the size of the original document (step S9), and the original document size detection step is then terminated (END).

A description will now be made on an image reading step (hereinafter referred to as a first image reading step) of the image copying method according to the first embodiment of the invention.

The first image reading step includes a first background correction process step for suppressing the see-through copying of the bottom side when an image is read.

The first image reading step includes the first background correction process step because the document holding cover 9A of the image copier 1A is formed with the LED setting holes which can cause the see-through copying of the bottom side when an image is read.

The first background correction process step includes a parameter selection step for selecting parameters required for the correction of CCD output values and a photoelectric element output value correction step for correcting CCD output values based on the parameters selected at the parameter selection step and the arithmetic expression given as Expression 1.

At the first background correction process step, the parameter selection element 49A of the background correction unit 44A selects parameters for a region based on the number of main-scan pixels, the number of sub-scan pixels, the central pixel, and the range of the region and sends information on the result of the parameter selection (a white reference value and a black reference value for a specific region or a white reference value and a black reference value for other regions) to the background correction process element 48 (parameter selection step).

The background correction process element 48 corrects CCD output values based on the information on the result of parameter selection (a white reference value and a black reference value) transmitted by the parameter selection element 49A and Expression 1 (photoelectric element output value correction process step). When the correction of the CCD output values is completed, the first background correction process step is terminated, and the first image reading step is also terminated.

The first image reading step is followed by an image formation step at which image processing such as color conversion, filtering, and gradation processing is performed by the image processing board 50 as occasion demands based on CCD output values of R (red), G (green), and B (blue) obtained after the background correction process.

According to the image copier and the image copying method of the first embodiment of the invention, since the light irradiated from the LED 10s is directly used in the state where the document holding cover 9A is closed, the size of an original document 4 can be detected without reflecting the light irradiated from the LED 10s with the document holding cover 9A closed.

Further, since the light radiated by the LEDs 10 is used as it is, the size of an original document can be accurately detected regardless of the influence of external light and the type of the original document.

Furthermore, since the CCD line sensor 26 as a light-receiving element for image reading is also used as a light-receiving element for detecting the size of an original document in the image copier 1A, there is no need for a separate light-receiving element for detecting the size of an original document, which allows a cost reduction to be achieved.

When an image is read, the see-through copying of the bottom side attributable to the LED setting holes is eliminated by executing the background correction process in the image copier 1A. It is therefore possible to eliminate the see-through copying of the bottom side without using a shielding plate and a device for driving the shielding plate. Since there is no need for a shielding plate and a device for driving the shielding plate, a contribution can be made to the cost reduction of a product.

Incidentally, in the image copier 1A, although the description has been given to the case where the LED 10 is used as the document size detecting light emitting element, an organic EL (Electro Luminescence) or another light emitting element to emit a visible light may be used instead of the LED 10.

Further, although the description has been given to the case where the CCD line sensor 26 is used as the image reading light receiving element, a CIS (Contact Image Sensor) may be used instead of the CCD line sensor 26.

Furthermore, although the size of an original document 4 in the longitudinal direction is detected using the fifth LED 10E, in order to improve the performance, the image copier 1A may have a configuration in which the fifth LED 10E is eliminated and in which an original document size detection sensor having a light emitting/receiving element according to the related art is provided in the scanner 2A to detect the size of a document tabled on the result of detection performed thereby.

Figure 14:
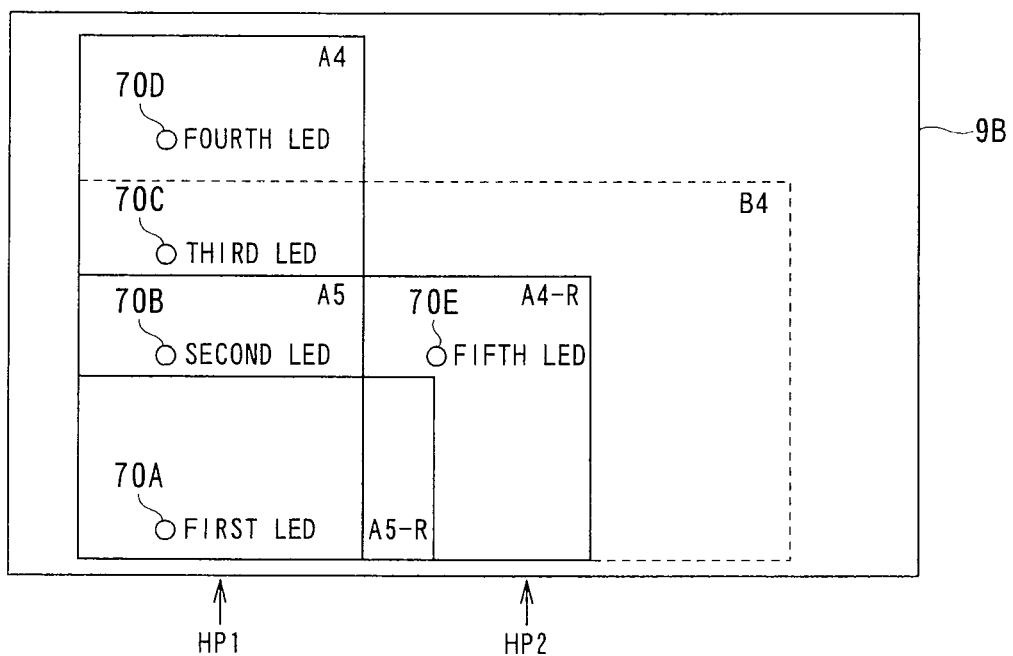
FIG. 14 is a plan view of another example of the document holding cover of the image copier according to the first embodiment of the invention taken from the side of the original document table glass.

In addition, although the first LED 10A to the fifth LED 10E are provided to the document holding cover 9A, a first photodiode (hereafter referred to as PD) 70A to a fifth PD 70E may be provided instead of the first LED 10A to the fifth LED 10E as shown in FIG. 14.

In the case of a scanner 2A provided with a document holding cover 9B as shown in FIG. 14, when the size of an original document is detected, the light source 13 shown in FIG. 2 emits light instead of the first LED 10A to the fifth LED 10E, and the first PD 70A to the fifth PD 70E receive the light instead of the CCD line sensor 26. Then, each of output signal values output by the first PD 70A to the fifth PD 70E is input to the threshold determination element 46.

The contents of processes executed by the threshold determination element 46 and the original document size determination element 47 are the same as those in the case in which the LED 10A to the fifth LED 10E are provided.

A specific region of 31×31 has been described in the present embodiment, which means that magnification for sub scanning is 100%. It is therefore obvious that the size of a specific region changes with the magnification for sub scanning.

In a common image reading apparatus, magnification for a sub scan is changed by changing the scanning speed of the carriage.

For example, a reduction of 50% is achieved by scanning the carriage at a speed that is twice the speed of a sub scan at a magnification of 100%. An enlargement of 200% is achieved by scanning the carriage at a speed that is one-half of the speed of a sub scan at a magnification of 100%.

Thus, the specific region becomes a region of 31 (main scan)×15 (sub scan) in the case of a reduction of 50% and becomes a region of 31 (main scan)×62 (sub scan) in the case of an enlargement of 200%.

Therefore, a change in magnification can be accommodated by changing the central pixel and the range of the region set by the parameter selection element 49A.

Incidentally, although the description has addressed a case in which magnification for sub scanning is changed, a change in magnification for main scanning can be accommodated in the same configuration.

Second Embodiment

An image copier according to a second embodiment of the invention has a configuration obtained by replacing the image processing circuit 33A of the scanner 2A in the image copier 1A with an image processing circuit 33B. The image processing circuit 33B is different from the image processing circuit 33A in that the image processing circuit 33B has a background correction unit 44B, whereas the image processing circuit 33A has the background correction unit 44A.

That is, the image copier according to the second embodiment of the invention is different from the image copier 1A in that it includes the image processing circuit 33B having the background correction unit 44B instead of the image processing circuit 33A having the background correction unit 44A, although there is no substantial difference between them in other aspects.

Therefore, in the description of the image copier according to the second embodiment of the invention, elements which are not substantially different from those in the image copier 1A will be indicated by like reference numerals to omit the description of them.

The background correction unit 44B of the image processing circuit 33B in the image copier according to the second embodiment of the invention will now be described.

Figure 15:
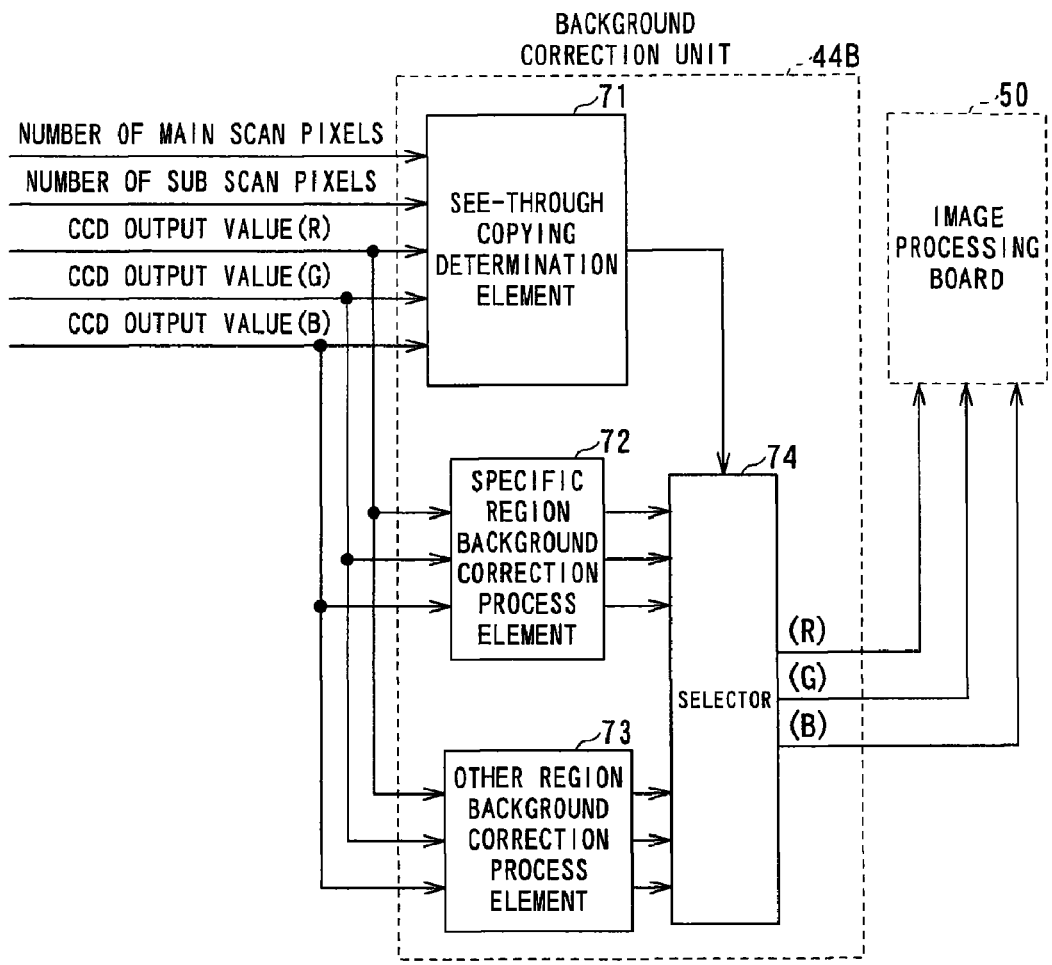
FIG. 15 is a schematic illustration of a configuration of a background correction unit in an image processing circuit of an image copier according to a second embodiment of the invention.

FIG. 15 schematically illustrates a configuration of the background correction unit 44B of the image processing circuit 33B in the image copier according to the second embodiment of the invention.

The background correction unit 44B includes a see-through copying determination element 71 for determining whether there is see-through copying of the bottom side on an image which has been received, a specific region background correction process element 72 for performing a background correction process in a specific region, an other region background correction process unit 73 for performing a background correction process on regions other than the specific region (hereinafter referred to as other regions), and a selector 74 for selecting a CCD output value to be output from among CCD output values input thereto based on the result of the determination made by the see-through copying determination element 71.

Figure 16:
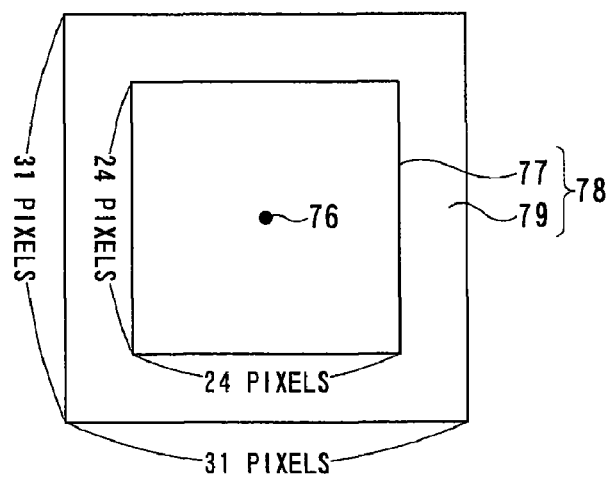
FIG. 16 is an illustration for explaining a difference between CCD output values calculated by a see-through copying determination element of the background correction unit of the image copier according to the second embodiment of the invention.

As shown in FIG. 16, the see-through copying determination element 71 calculates a difference between, for example, an average of CCD output values in a central region 77 consisting of 24 pixels×24 pixels or so including a central pixel 76 (hereinafter referred to as Ave_A) and, for example, an average of CCD output values in a peripheral region 79 of a reference region 78 consisting of 31 pixels×31 pixels or so excluding the central region 76 (hereinafter referred to as Ave_B).

Then, the calculated difference between Ave_A and Ave_B is compared with a preset threshold, and it is determined that there is see-through copying of the bottom side if the threshold is exceeded. If the difference between the averages is less than the threshold, it is determined that there is no see-through copying of the bottom side. The result of the determination on the presence of see-through copying of the bottom side is input to the selector 74.

The specific region background correction process element 72 and the other region background correction process element 73 execute a background correction process based on table information on the background correction process possessed by each of the elements. Then, CCD output values of R, G, and B after the background correction processes are transmitted to the selector 74.

The selector 74 selects the specific region background correction process element 72 or the other region background correction process element 73 based on the result of the determination on the presence of see-through copying of the bottom side input from the see-through copying determination element 71 and outputs the output from the selected element.

Figure 17A:
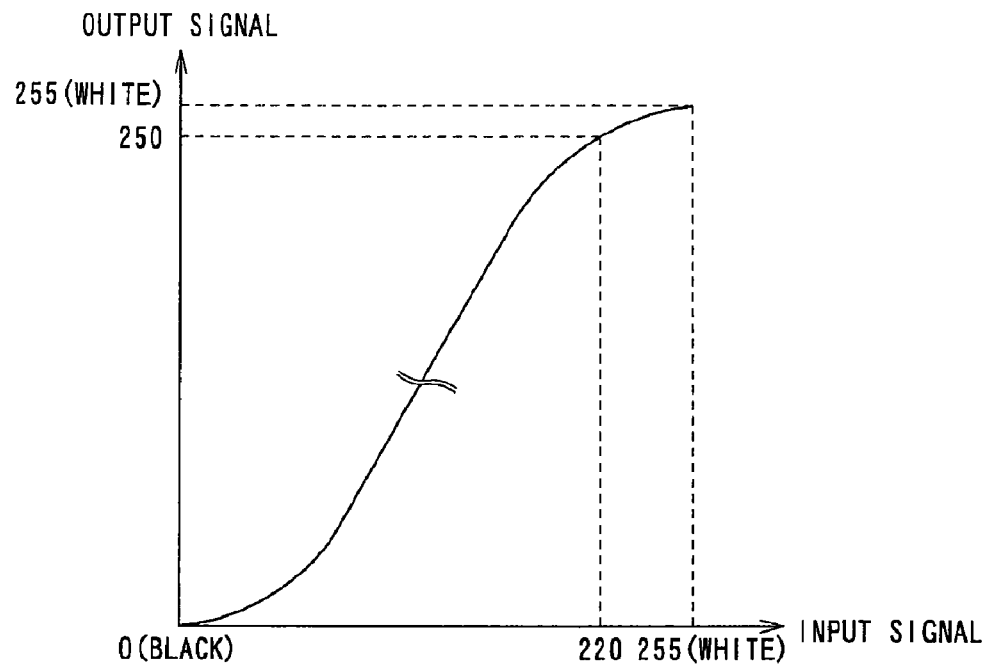
FIG. 17A is a graph showing an example of input/output characteristics of a specific region background correction process element of the background correction unit of the image copier according to the second embodiment of the invention.
Figure 17B:
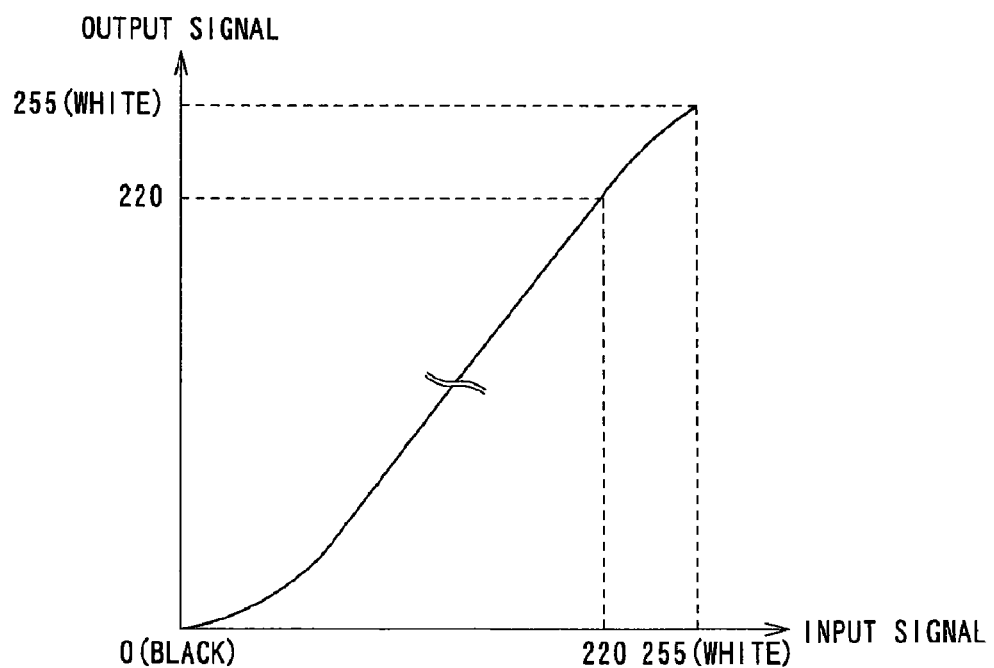
FIG. 17B is a graph showing an example of input/output characteristics of an other region background correction process element of the background correction unit of the image copier according to the second embodiment of the invention.

FIGS. 17A and 17B show examples of input/output characteristics of the specific region background correction process element 72 and the other region background correction process element 73, respectively.

For example, the specific region background correction process element 72 has information on input/output characteristics in which a region close to white is narrowed as shown in FIG. 17A, the information constituting table information for a background correction process. For example, in the input/output characteristics shown in FIG. 17A, an input value of 220 is turned into an output value of 250. That is, a correction is made to make the output value closer to white than the input value.

For example, the other region background correction process element 73 has information on ordinary input/output characteristics as table information for a background correction process as shown in FIG. 17B. For example, in the input/output characteristics shown in FIG. 17B, since an output value corresponding to an input value of 220 is 220, the other region background correction process element 73 outputs the value of 220 as the output value in case where the input value is 220.

An image copying method according to the second embodiment of the invention will now be described.

The image copying method according to the second embodiment of the invention is not substantially different from the image copying method according to the first embodiment of the invention except that the first background correction process step of the first image reading step is replaced by a second background correction process step. Therefore, the description of the image copying method according to the second embodiment of the invention will address the second background correction process step and will omit other process steps.

The second background correction process step includes a see-through copying determination step for determining see-through copying of the bottom side, a specific region photoelectric element output value correction step for correcting CCD output values in a specific region, an other region photoelectric element output value correction step for correcting CCD output values in regions other than the specific region (other regions), and a photoelectric element output value selection step for selecting either the CCD output values corrected at the specific region photoelectric element output value correction step or the CCD output values corrected at the other region photoelectric element output value correction step based on the result of the see-through copying determination step.

First, the see-through copying determination step, the specific region photoelectric element output value correction step, and the other region photoelectric element output value correction step are executed at the second background correction process step.

At the see-through copying determination step, a see-through copying determination element 70 determines the presence of the see-through copying of the bottom side and sends information on the determination result to the selector 74.

At the specific region photoelectric element output value correction step, the specific region background correction process element 72 performs a background correction process based on table information on a background correction process in a specific region and sends CCD output values of R, G, and B after the background correction process to the selector 74.

At the other region photoelectric element output value correction step, the other region background correction process element 73 performs a background correction process based on table information on a background correction process in other regions and sends CCD output values of R, G, and B after the background correction process to the selector 74.

In case where all process steps at the see-through copying determination step, the specific region photoelectric element output value correction step, and the other region photoelectric element output value correction step are completed, the photoelectric element output value selection step is executed.

At the photoelectric element output value selection step, the selector 74 selects the specific region background correction process element 72 or the other region background correction process element 73 based on the result of the determination at the see-through copying determination step and outputs the CCD output values of the selected element.

When the photoelectric element output value selection step is completed, the second background correction process step is terminated.

The image copier and the image copying method according to the second embodiment of the invention can provide the same advantage as that of the image copier and the image copying method according to the first embodiment of the invention.

Further, the image copier according to the second embodiment of the invention can perform a background correction process more finely than the image copier 1A because it corrects CCD output values based on information on a correction table.

Although the background correction unit 44B has been described as having one specific region background correction process element 72, there may be a plurality of the elements. In this case, the see-through copying determination element 71 compares the difference between Ave_A and Ave_B with each of a plurality of preset thresholds to determine whether it exceeds the threshold. The difference is thus classified into some levels, and the result is sent to the selector 74. The selector 74 selects a specific region background correction process element 72 associated with each of the levels.

Third Embodiment

An image copier according to a third embodiment of the invention is a version of the image copier according to the first embodiment added with the function of detecting the thickness of an original document (hereinafter referred to as an original document thickness detecting function).

Figure 18:
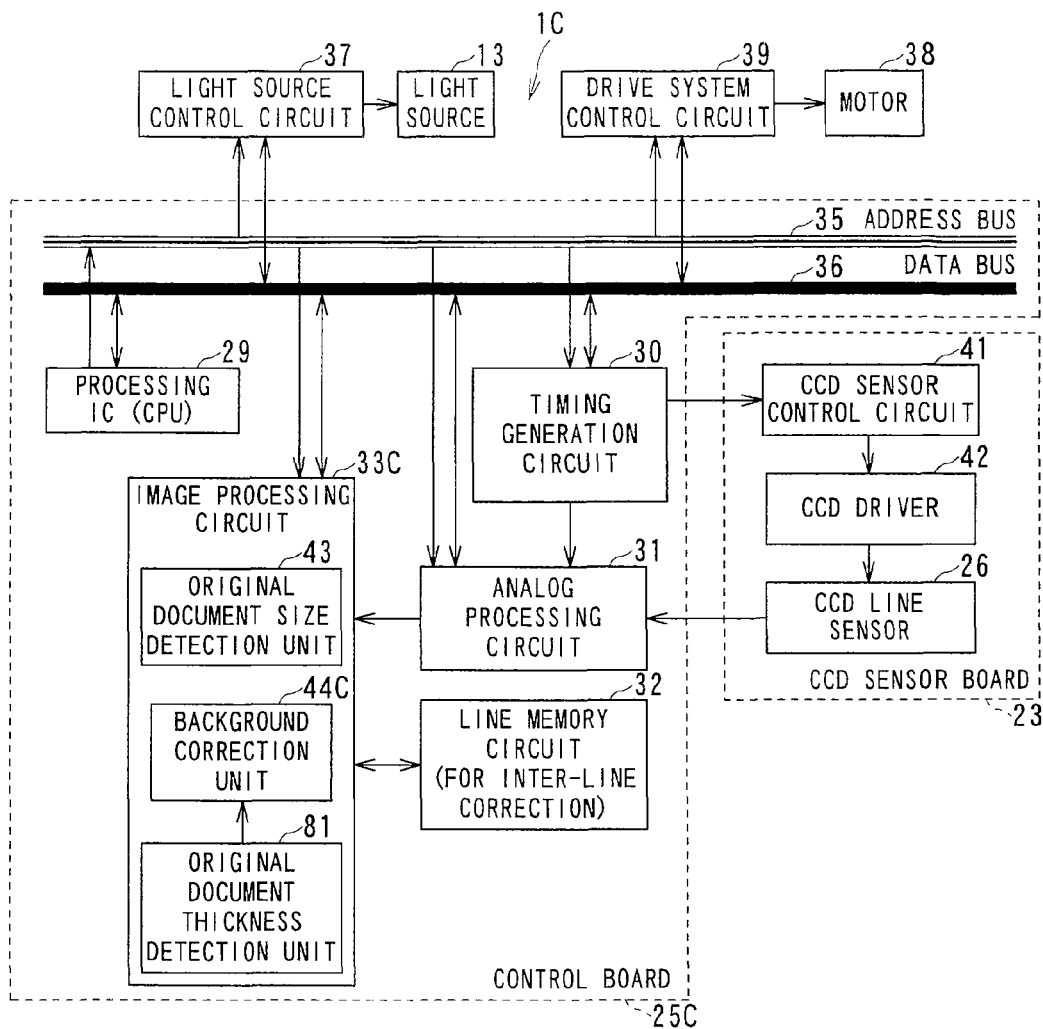
FIG. 18 is a diagram for explaining a configuration and objects of control of a control board of an image copier according to a third embodiment of the invention.

FIG. 18 is an illustration for explaining a configuration and objects of control of a control board 25C of an image copier 1C which is an example of an image copier according to the third embodiment of the invention.

As shown in FIG. 18, the image copier 1C is a version of the image copier 1A in which the image processing circuit 33A is replaced with an image processing circuit 33C having an original document thickness detection unit 81 having the original document thickness detecting function. The image processing circuit 33C also includes a background correction unit 44C which replaces the background correction unit 44A provided in the image processing circuit 33A.

That is, elements constituting the image copier 1C are not substantially different from those of the image copier 1A except the background correction unit 44C and the original document thickness detection unit 81 of the image processing circuit 33C. Therefore, the elements other than the background correction unit 44C and the original document thickness detection unit 81 are indicated by like reference numerals and will not be described.

Figure 19:
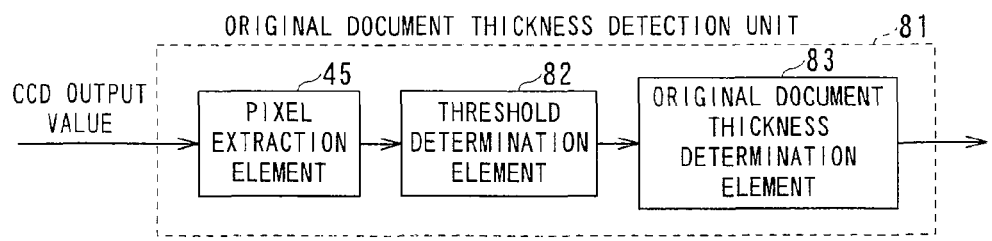
FIG. 19 is a schematic illustration of a configuration of an original document thickness detection unit of the image copier according to the third embodiment of the invention.

FIG. 19 is a schematic illustration of a configuration of the original document thickness detection unit 81.

The original document thickness detection unit 81 includes a pixel extraction element 45, a threshold determination element 82 which has a plurality of thresholds, e.g., four thresholds (which are specifically TH1 to TH4 shown in FIG. 20 to be described later) and which compares the size of an object with each of the thresholds, and an original document thickness determination element 83 for determining the thickness of an original document 4 which has been positioned, based on the result of the determination made by the threshold determination element 82.

CCD output signals obtained by receiving light emitted by the LED 10A with the CCD line sensor 26 are input to the original document thickness detection unit 81 after being subjected to signal processing of various types such as A-D conversion. The light radiated from the LED 10A is used because the LED 10A is provided in a position where it is not shaded from light regardless of the size of the original document 4 and because the quantity of light received from the same will therefore not depend on the size of the original document 4.

The CCD output signals after the signal processing are first input to the pixel extraction element 45 of the original document thickness detection unit 81. The pixel extraction element 45 extracts a predetermined group of pixels including a pixel associated with the first LED 10A (e.g., five each pixels preceding and succeeding the pixel) and transmits CCD output values of the extracted pixel group to the threshold determination element 82.

The threshold determination element 82 extracts the maximum value among the CCD output values of the eleven pixels including the five each preceding and succeeding pixels extracted by the pixel extraction element 45. The extracted maximum value is compared with each of the predetermined thresholds to determine the quantity of the light transmitted by the original document 4 to classify the level of the same.

Figure 20:
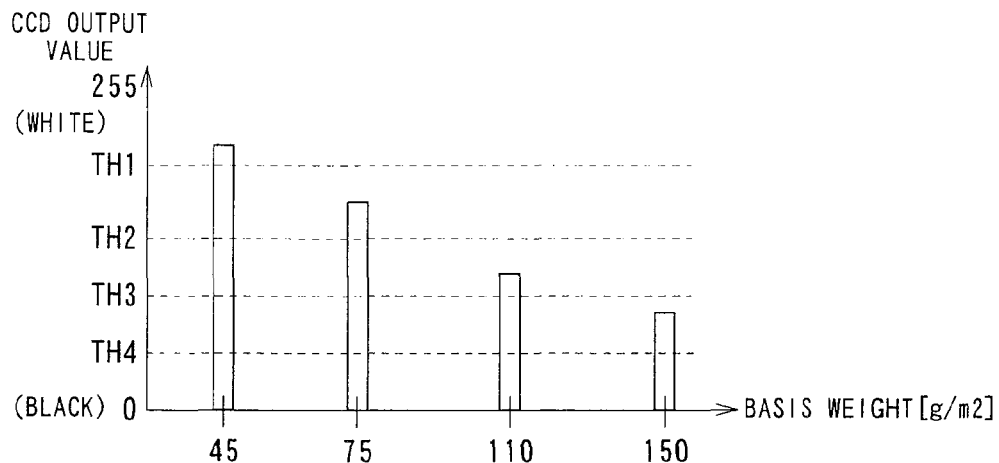
FIG. 20 is a correlation diagram showing a relationship between the thickness (basis weight) of an original document and CCD output values.

For example, when TH1>TH2>TH3>TH4 as shown in FIG. 20 to be described later, the CCD output value is classified as level 1 if it is in the excess of TH1, classified as level 2 if it is equal to or smaller than TH1 and in the excess of TH2, classified as level 3 if it is equal to or smaller than TH2 and in the excess of TH3, classified as level 4 if it is equal to or smaller than TH3 and in the excess of TH4, and classified as level 5 if it is equal to or smaller than TH4.

After the classification according to the quantity of the light transmitted by the original document 4, the threshold determination element 82 transmits information on the result of the determination to the original document thickness determination element 83.

A description will now be made on how the original document thickness determination element 83 determines the thickness of the original document 4 with reference to FIG. 20.

FIG. 20 is a graph showing a relationship between the thickness (basis weight) of an original document 4 and CCD output values. TH1 to TH4 shown in FIG. 20 represent thresholds set in the threshold determination element 82.

As shown in FIG. 20, a greater quantity of light is transmitted by the original document 4 to provide a greater CCD output value, the smaller the thickness of the original document 4. The original document thickness determination element 83 determines the thickness of the original document 4 taking advantage of the fact that the CCD output value changes with the basis weight.

The original document thickness determination element 83 has information on a relationship between the quantity of light transmitted by the original document 4 (the information on the level of the same determined by the threshold determination element 82) and the thickness (basis weight) of the original document 4 as shown in Table 3. The thickness of the original document is determined based on the information on the level of the same received from the threshold determination element 82 and the information shown in Table 3.

TABLE 3

| Level of CCD Output Value | Thickness (Basis Weight [g/m2]) of Original Document |
|---|---|
| Level 1 | 45 |
| Level 2 | 75 |
| Level 3 | 110 |
| Level 4 | 150 |
| Level 5 | 150 or more |

For example, when information indicating the level 4 is received from the threshold determination element 82, the original document thickness determination element 83 determines the original document thickness associated with the level 2 in Table 3 as the thickness of the original document 4. Therefore, the original document thickness determination element 83 determines that the original document 4 has a thickness of 75 [g/m2].

The original document thickness determination element 83 assigns the result of the original document thickness determination, i.e., the five basis weight values from 45 [g/m2] to 150 or more [g/m2] to values 0 to 4 and thereafter outputs the relevant value among 0 to 4 to the processing IC 29.

Upon receipt of the information on the thickness of the original document, the processing IC 29 displays the result of the determination on the control panel 64 shown in FIGS. 10 to 12.

The result of the original document thickness determination is also sent from the original document thickness determination element 83 to the background correction unit 44C.

Figure 21:
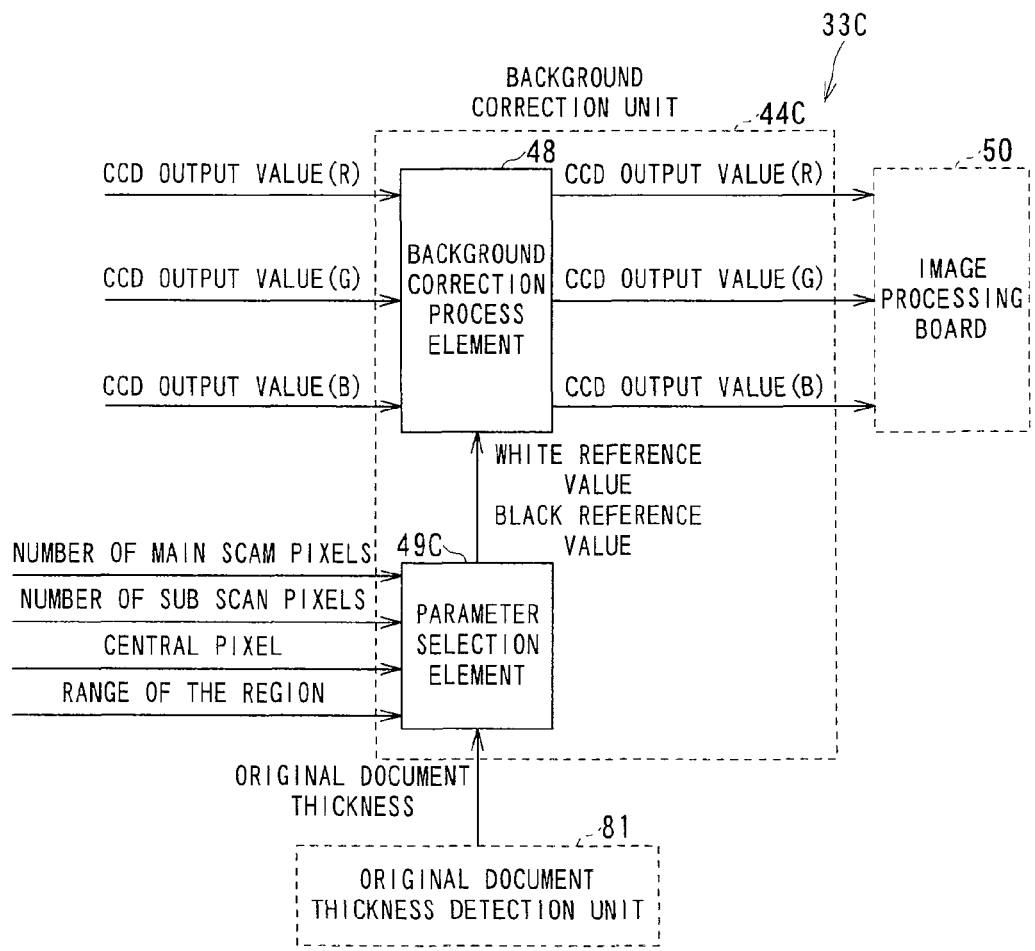
FIG. 21 is a schematic illustration of a configuration of a background correction unit of the image copier according to the third embodiment of the invention.

FIG. 21 is a diagram schematically showing a configuration of the background correction unit 44C.

The background correction unit 44C is not substantially different from the background correction unit 44A except that it has a parameter selection element 49C instead of the parameter selection element 49A. The description will therefore address the parameter selection element 49C, and other elements will be indicated by like reference numerals and omitted in the description.

The parameter selection element 49C has information on white reference values and black reference values (information corresponding to FIG. 2) for a specific region and other regions associated with each original document thickness. The element selects the information on the white reference values and black reference values for the specific region and other regions associated with the thickness of the original document 4 detected by the original document thickness detection unit 81. Subsequent operations are similar to those of the parameter selection element 49A.

An image copying method according to the third embodiment of the invention will now be described.

Processing steps of the image copying method according to the third embodiment of the invention are not substantially different from those of the image copying method according to the first embodiment of the invention except that the first image reading step is replaced by a third image reading step. Therefore, the description of the image copying method according to the third embodiment of the invention will address the third image reading step and will omit other processing steps.

The third image reading step includes an original document thickness detection step for detecting the thickness of an original document 4 from which an image is to be read and a third background correction process step for suppressing the see-through copying of the bottom side according to the thickness of the original document detected at the original document thickness detection step when the image is read.

First, the original document thickness detection step of the third image reading step will be described.

Figure 22:
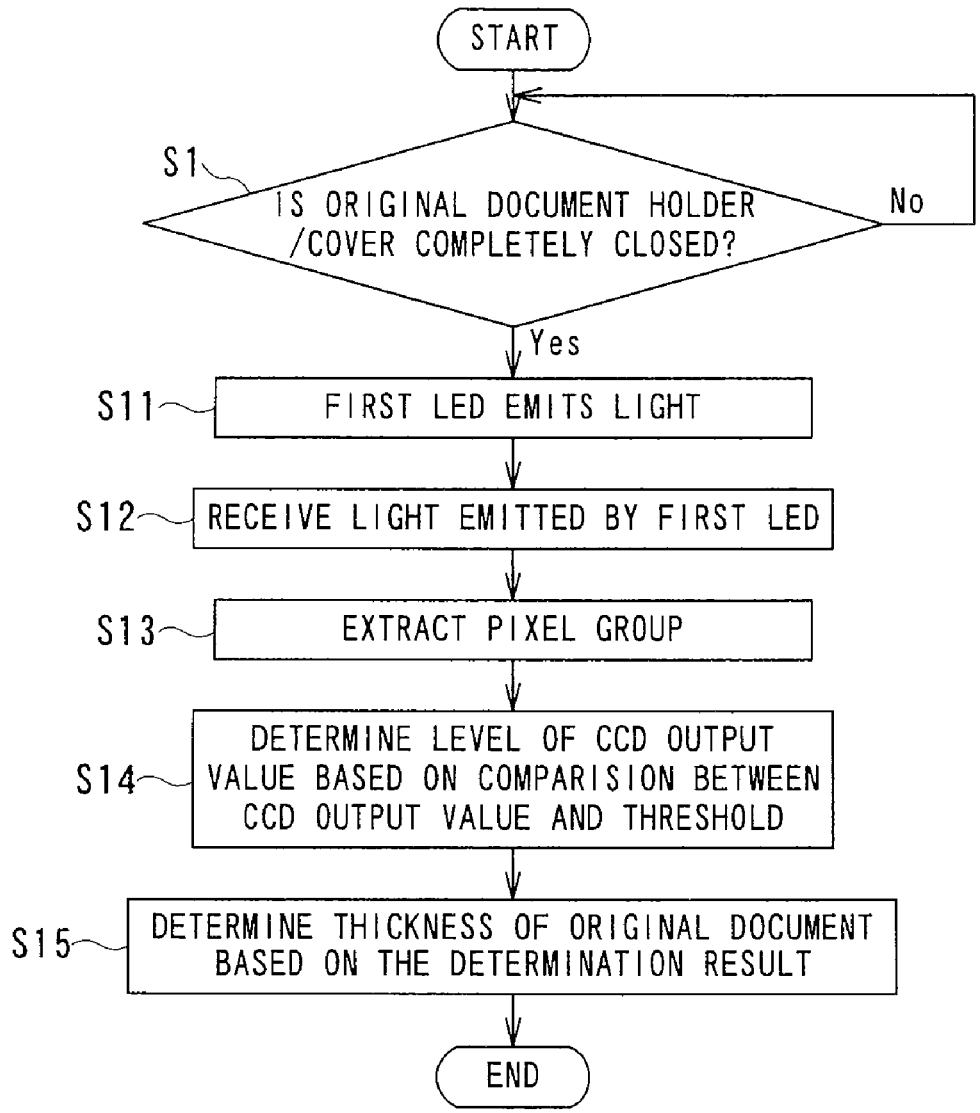
FIG. 22 is a flow chart for explaining an original document thickness detection step of an image copying method according to the third embodiment of the invention.

FIG. 22 is a flow chart for explaining the original document thickness detection step of the image copying method according to the third embodiment of the invention.

The original document thickness detection step includes a document holding cover closure confirmation step (step S1) for detecting whether the document holding cover 9A is closed or not to confirm that the document holding cover 9A is closed, an original document thickness detection light-emitting element emission step (step S11) for causing the emission of the LED 10A as a light emitting element for detecting the thickness of an original document, a radiated light receiving step (step S12) for receiving the light radiated by the LED 10A, a pixel group extraction step (step S13) for extracting a predetermined pixel group including a pixel associated with the LED 10A, a threshold determination step (step S14) for determining whether a CCD output value of the pixel group extracted at the pixel extraction step is in the excess of a preset threshold or not, and an original document thickness determination step (step S15) for determining the thickness of the original document from which an image is to be read based on the result of the determination at the threshold determination step.

At the original document thickness detection step, it is first detected at step S1 whether the document holding cover 9A is completely closed or not. In case Where the document holding cover 9A is completely closed (in the case of YES at step S1), the first LED 10A provided in a position associated with the first home position is then made to emit light at step S11.

The light emitted by the first LED 10A is received by the CCD line sensor 26 through the first carriage 16 which has been waiting in the first home position, the second carriage 20, and the collective lens 22 (step S12).

When the radiated light receiving step (step S12) terminates, the pixel extraction element 45 extracts predetermined pixel groups including the pixels associated with the LEDs 10 (step S13). The threshold determination element 46 determines the degree of transmission of the light emitted by the LED 10A through the original document 4 based on the CCD output values of the extracted pixel groups (step S14), and the original document thickness determination element 83 determines the thickness of the original document based on the result of the threshold determination step and the information shown in Table 3 (step S15) to terminate the original document thickness detection step (END).

When the document holding cover 9A is not completely closed (in the case of NO at step S1), the process waits until the document holding cover 9A is completely closed while repeating the process step at step S1.

Next, the third background correction process step will now be described.

The third background correction process step is not substantially different from the contents of processing executed at the first background correction process step except that the information on the thickness of the original document 4 detected at the original document thickness detection step is added to information for selecting parameters at the parameter selection step.

Specifically, at the parameter selection step of the third background correction process step, the parameter selection element 49C selects parameters for a region based on the number of main-scan pixels, the number of sub-scan pixels, the central pixel, and the range of the region and the information on the thickness of the original document and sends information on the result of the parameter selection (a white reference value and a black reference value for a specific region or a white reference value and a black reference value for other regions) to the background correction process element 48.

Note that a photoelectric element output value correction process step of the third background correction process step will not be described because it is substantially the same as the photoelectric element output value correction process step of the first background correction process step.

The image copier and the image copying method according to the third embodiment of the invention allow the thickness of an original document 4 to be detected before an image is read in addition to the same advantage as the image copier and the image copying method according to the first embodiment of the invention.

Further, since the thickness of an original document 4 can be detected, parameters for a background correction process can be selected according to the thickness of the original document 4.

Although the image copier 1C has been described as a version of the image copier 1A in which the image processing circuit 33A further includes an original document thickness detection unit 81, an alternative configuration may be provided by adding an original document thickness detection unit 81 to the image processing circuit 33B of the image copier according to the second embodiment of the invention.

When the PDs 70 to 70E are provided on the document holding cover 9B as shown in FIG. 14, the thickness of an original document 4 can be detected by using the PDs 70 to 70E as light-receiving elements for the detection of the thickness of the original document and using the light source 13 as a light-emitting element for the detection of the thickness of the original document.

Although the third image reading step of the image copying method according to the third embodiment of the invention has been described as further including the original document thickness detection step in addition to the first image reading step, the original document thickness detection step may alternatively be added to the second image reading step.

Although the original document thickness detection step has been described as a process step included in the third image reading step, it is not essential to include the step in the third image reading step.

For example, the image copying method according to the third embodiment of the invention may comprise the original document size detection step, the original document thickness detection step, the first image reading step, and the image formation step, and the original document size detection step may include the original document thickness detection step.

In case Where the original document size detection step includes the original document thickness detection step, step S1 to step S13 of the original document thickness detection step may be performed in common with the process steps at step S1 to step S3 and step S6 of the original document size detection step. That is, step S1 to step S13 of the original document thickness detection step can be executed by executing step S1 to step S3 and step S6 of the original document size detection step.

Fourth Embodiment

Figure 23:
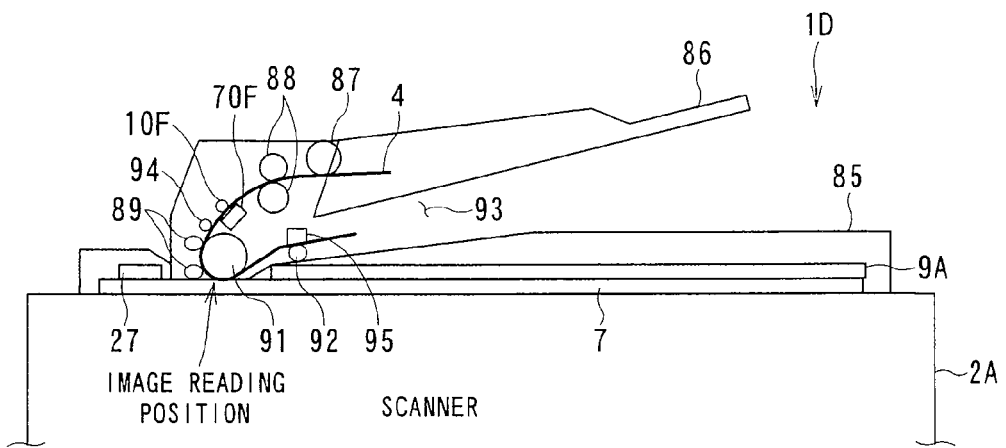
FIG. 23 is a schematic illustration of a configuration of a first automatic document feeder of an image copier according to a fourth embodiment of the invention.

FIG. 23 is a schematic illustration of a configuration of a first automatic document feeder (hereinafter referred to as a first ADF) 85A of an image copier 1D which is an example of an image copier according to a fourth embodiment of the invention.

The image copier 1D is a version of the image copier according to the third embodiment further comprising the first ADF 85A. The first ADF 85 feeds original documents 4 set in an original document supply unit 86 one sheet at a time with a pickup roller 87 when requested to start by a user. The original document 4 thus fed is guided to an original document discharging unit 93 by a registration roller pair 88, first transport rollers 89 and 90, a transport drum 91, and a second transport roller 92.

On the path for transporting the original document 4 from the original document supply unit 86 to the original document discharging unit 93, there is provided an original document detection switch 94 for detecting the presence of the original document 4, a sixth LED 10F as a light-emitting element for detecting the thickness of the original document and a sixth photodiode 70F as a light-receiving element for detecting the thickness of the original document which are disposed opposite to each other to detect the thickness of the original document 4, and a contact image sensor (CIS) 95 for reading an image on the bottom side of the original document 4.

An image on the top side of the original document is read on a document table glass 7 provided on the path for transporting the original document 4 from the original document supply unit 86 to the original document discharging unit 93. When the original document 4 is located on the original document table glass 7, the original document 4 is irradiated with light from the light source 13 in the same way as in the case there is no first ADF 85A as shown in FIG. 2, and light reflected by the original document 4 is received by the CCD line sensor 26. An image on the bottom side of the original document is read by the CIS 95.

Referring to the detection of the thickness of the original document 4, the sixth LED 10F first emits light at timing when the original document 4 resides between the sixth LED 10F and the sixth photodiode 70F, and the light radiated by the sixth LED 10F and transmitted by the original document 4 is received by the sixth photodiode 70F. The original document thickness detection unit 81 makes a determination based on the level of an output signal output by the sixth photodiode 70F according to the quantity of the light received.

Since the image copier 1D reads images on both sides of the original document 4, a background correction process is performed for each of the images read from the top side and the bottom side. A background correction process for the image read from the bottom side is executed based on the level of an output signal from the CIS 95 input to the background correction unit 44C.

The timing of the image reading and the detection of the thickness of the original document 4 is adjusted with reference to the timing at which the original document 4 is detected by the original document detection switch 94.

As another embodiment of the image copier 1D, a second ADF 85B may be provided instead of the first ADF 85A.

Figure 24:
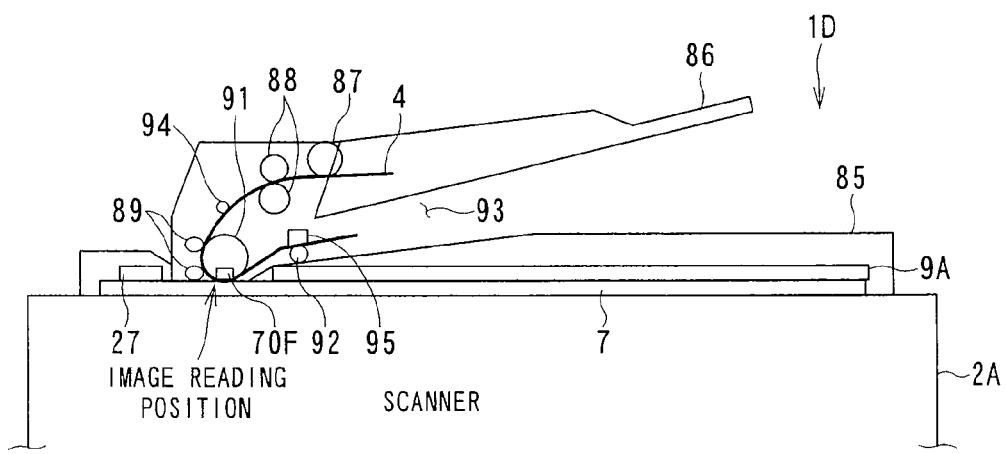
FIG. 24 is a schematic illustration of a configuration of a second automatic document feeder of the image copier according to the fourth embodiment of the invention.

FIG. 24 is a schematic illustration of a configuration of the second ADF 85B of an image copier 1D which is an example of an image copier according to the fourth embodiment of the invention.

The second ADF 85B is different from the first ADF 85A in that the light source 13 is used as a light-emitting element for detecting the thickness of an original document instead of the sixth LED 10F. In the second ADF 85B, therefore, the sixth LED 10F is not provided on the path of transportation of an original document 4 from the original document supply unit 86 to the original document discharging unit 93, and the photodiode 70F is provided in a position different from that in the first ADF 85A.

Referring to the detection of the thickness of an original document 4 in the case of the image copier 1D having the second ADF 85B, the light source 13 emits light at timing when the original document 4 resides between the light source 13 and the photodiode 70F, and the light radiated from the light source 13 and transmitted by the original document 4 is received by the sixth photodiode 70F. The original document thickness detection unit 81 makes a determination based on the level of an output signal output by the sixth photodiode 70F according to the quantity of the light received.

Note that the difference between the image copier 1C and the image copier 1D makes no change in the image copying method on which no description will therefore be made here.

In addition to the advantage provided by the image copier and the image copying method according to the third embodiment of the invention, the image copier and the image copying method according to the fourth embodiment of the invention makes it possible to detect the thickness of an original document before the leading end of the original document 4 reaches an image reading position, which allows a background correction process to be performed on images to be read from the top and bottom sides of the original document 4 based on the result of the thickness determination.

Further, since the light source 13 as a light-emitting element for reading an image is also used as a light-emitting element for detecting the thickness of an original document in the image copier 1D, a cost reduction can be achieved by using a common component as the light-emitting element for image reading and the light-emitting element for document thickness detection.

As described above, the invention allows the size of an original document to be determined using direct light with a document holding cover closed. It is therefore possible to detect the size of an original document with high accuracy regardless of the influence of external light and the type of the original document.

Since a light-receiving element for detecting the size of an original document or a light-emitting element for detecting the size of an original document can be commonly used as a light-receiving element for reading an image or a light-emitting element for reading an image, the cost of a product can be reduced.

Since the see-through copying of a bottom side attributable to LED setting holes is eliminated by performing a background correction process, the see-through copying of a bottom side can be eliminated without using a shielding plate and a device for driving the shielding plate. Furthermore, since there is no need for a shielding plate and a device for driving the shielding plate, a contribution can be made to a cost reduction of a product.

The invention makes it possible to detect the thickness of an original document 4 before reading an image. Since the thickness of an original document 4 can be detected, parameters of a background correction process can be selected according to the thickness of the original document 4 and depending on the situation, i.e., the front or back of the original document 4 or a specific region thereof or a region other than the same.

The invention is not strictly limited to the above-described embodiments and may be embodied by modifying elements without departing from the spirit of the same when implemented. A variety of inventions can be made by combining a plurality of the elements disclosed in the above-described embodiments appropriately. For example, several elements may be deleted from the entire elements disclosed in the embodiments. Further, elements used in different embodiments may be combined as occasion demands.

For example, although the image copiers 1A to 1D have been described as apparatus according to the invention in the present specification, the scanner 2A may be used alone as an image reading apparatus, an original document size detector which performs only the detection of the size of an original document without reading an image from the original document 4, or an original document thickness detector which performs only the detection of the thickness of an original document without reading an image from the original document 4.

Similarly, although image copying methods have been described as methods according to the invention, it is possible to use the image reading step including the original size detection step described in the present specification as an image reading method, to use the original size detection step as a method of detecting the size of an original document, and to use the original document thickness detection step as a method of detecting the thickness of an original document.

What is claimed is:

1. An image copier comprising a scanner configured to read an image and a printer configured to form the image on a sheet, wherein said scanner includes:
   a document table configured to position an original document from which an image is to be read;
   a document holding cover configured to hold the original document on the original document table and which has a light-emitting element for detecting the size of an original document which emits light when the size of the original document is detected;
   a light source configured to irradiate the original document with light when an image on the original document is read;
   a light-receiving element for image reading which receives reflected light from the original document;
   a controller for the light-emitting element for detecting the size of an original document which controls the light-emitting element for detecting the size of the original document;
   a specific region determination unit configured to identify a specific region based on the numbers of pixels in a main scanning direction and a sub scanning direction of image data; and
   a background correction unit configured to perform a process of correcting the background of an image which has been read.

2. An image copier according to claim 1, wherein said specific region is a preset region having a certain range including a pixel in the middle thereof associated with the position of the light-emitting element provided to the document holding cover.

3. An image copier according to claim 1, wherein said background correction unit determines whether a background correction process is needed in accordance with a difference in density between a central region located around a pixel which has been read and corresponding in size to the light-emitting element and a peripheral region having a certain range set in advance around the central region.

4. An image copier according to claim 3, wherein said ranges of the central region and said peripheral region are changed in accordance with a change in magnification in at least one of the main scanning direction and the sub scanning direction.

5. An image copier according to claim 1, wherein said background correction unit includes:
   a parameter selection element configured to select one of parameters to be used for a background correction process based on the result of a determination on whether a pixel represented by an input image signal resides in a specific region or not; and
   a background correction process element configured to perform a background correction process on the image signal based on the result of substitution of the single parameter selected by the parameter selection element in an arithmetic expression which is set in advance.

6. An image copier according to claim 5, wherein said parameter selection element has at least a first parameter for performing a background correction process on an image signal of a pixel residing in the specific region and a second parameter for performing a background correction process on an image signal of a pixel out of the specific region and wherein said first parameter and said second parameter are different parameters.

7. An image copier according to claim 1, wherein said background correction unit includes:
   a see-through copying determination element configured to determine whether a pixel which has been read resides in a specific region according to a difference in density between a central region located around the read pixel and corresponding in size to the light-emitting element and a peripheral region having a certain range set in advance around the central region;

a background correction element for the specific region which performs a background correction process on an image signal of a pixel residing in the specific region;

a background correction element for other regions which performs a background correction process on an image signal of a pixel out of the specific region; and a selector which selects one of the background correction element for the specific region and the background correction element for other regions according to the result of the determination made by the see-through copying determination element.

8. An image copier according to claim 1, wherein said background correction unit includes:

a see-through copying determination element configured to establish levels according to a difference in density between a central region located around the read pixel and corresponding in size to the light-emitting element and a peripheral region having a certain range set in advance around the central region;

a plurality background correction elements for the specific region which perform different background correction processes, respectively, on an image signal of a pixel residing in the specific region;

a background correction element for other regions which performs a background correction process on an image signal of a pixel out of the specific region; and a selector configured to select one of the plurality of background correction elements for the specific region and the background correction element for other regions in accordance with the result of the determination made by the see-through copying determination element and to output an image signal obtained after the background correction process.

9. An image copier comprising a scanner configured to read an image and a printer configured to form the image on sheet, wherein said scanner includes:

a document table configured to position an original document from which an image is to be read;

a light source configured to irradiate the original document with light when an image on the original document is read;

a light-receiving element for image reading which receives reflected light from the original document;

a document holding cover configured to hold the original document on the original document table;

a light-emitting element for detecting the thickness of the original document which emits light when the thickness of the original document is detected;

a light-receiving element for detecting the thickness of the original document which receives the light radiated by the light-emitting element configured to detect the thickness of the original document;

an original document thickness detection unit configured to detect the thickness of the original document based on the level of an output signal from the light-receiving element for detecting the thickness of the original document which has received the light radiated by the light-emitting element configured to detect the thickness of the original document; and a controller for the light-emitting element for detecting the thickness of the original document which controls the light-emitting element for detecting the thickness of the original document.

10. An image copier according to claim 9, wherein said original document thickness detection unit detects the thickness of the original document based on the result of a comparison between the level of the output signal of the light-receiving element for image reading and respective thresholds which are set in advance.

11. An image copier according to claim 9, wherein said light-emitting element for detecting the thickness of the original document is provided to the document holding cover.

12. An image copier according to claim 11, wherein said light-receiving element for detecting the thickness of the original document is commonly used as the light-receiving element for image reading.

13. An image copier according to claim 9, further comprising an automatic document feeder, wherein said light-emitting element for detecting the thickness of the original document and said light-receiving element for detecting the thickness of the original document are provided in positions opposite to each other within an original document transport path of the automatic document feeder and upstream of at least an image reading starting position.

14. An image copier according to claim 9, further comprising an automatic document feeder, wherein said light-receiving element for detecting the thickness of the original document is provided within an original document transport path of the automatic document feeder in an image reading starting position.

15. An image copier according to claim 9, wherein said light-receiving element for detecting the thickness of the original document is provided to the document holding cover.

16. An image copier according to claim 15, wherein said light-emitting element for detecting the thickness of the original document commonly serves as the light source.

17. An image copier according to claim 9, further comprising a background correction unit configured to perform a background correction process on an image which has been read.

18. An image copier according to claim 17, wherein said background correction unit includes:

a parameter selection element configured to select one of parameters to be used for a background correction process based on the result of a determination on whether a pixel represented by an input image signal resides in a specific region or not and the thickness of the original document detected by the original document thickness detection unit; and a background correction process element configured to perform a background correction process on the image signal based on the result of substitution of the single parameter selected by the parameter selection element in an arithmetic expression which is set in advance.

19. An image copier according to claim 17, wherein said background correction unit includes:

a see-through copying determination element configured to determine whether a pixel which has been read resides in the specific region according to a difference in density between a central region located around the read pixel and corresponding in size to the light-emitting element and a peripheral region having a certain range set in advance around the central region and the thickness of the original document detected by the original document thickness detection unit;

a background correction element for the specific region which performs a background correction process on an image signal of a pixel residing in the specific region;

a background correction element for other regions which performs a background correction process on an image signal of a pixel out of the specific region; and a selector configured to select one of the plurality of background correction elements for the specific region and the background correction element for other regions according to the result of the determination made by the see-through copying determination element and to output an image signal obtained after the background correction process.

20. An image copier according to claim 17, wherein said background correction unit includes:
  a see-through copying determination element configured to establish levels according to a difference in density between a central region located around the read pixel and corresponding in size to the light-emitting element and a peripheral region having a certain range set in advance around the central region and the thickness of the original document detected by the original document thickness detection unit;
  a plurality of background correction elements for the specific region which perform different background correction processes, respectively, on an image signal of a pixel residing in the specific region;
  a background correction element for other regions which performs a background correction process on an image signal of a pixel out of the specific region; and
  a selector configured to select one of the plurality of background correction elements for the specific region and the background correction element for other regions according to the result of the determination made by the see-through copying determination element and to output an image signal obtained after the background correction process.

21. An image copying method comprising:
  reading an image from an original document;
  forming the image read at the image reading step;
  detecting the thickness of the original document from which the image is read; and
  selecting a parameter required for correcting an output value from a photoelectric element, wherein said parameter selection step selects the parameter, taking the thickness of the original document detected at the original document thickness detection step into account.

22. An image copying method comprising reading an image from an original document and forming the image read at the image reading step, said image reading step including:
  determining see-through copying of a bottom side;
  correcting a CCD output value in a specific region;
  correcting a CCD output value in a region other than the specific region; and
  selecting one of the CCD output value corrected at the specific region photoelectric element output value correction step and the CCD output value corrected at the other region photoelectric element output value correction step based on the result of the see-through copying determination step.

23. An image copying method according to claim 22, further comprising detecting the thickness of an original document from which an image is to be read, wherein said see-through copying determination step determines the presence of see-through copying of the bottom side, taking the thickness of the original document detected at the original document thickness detection step into account.

24. An image copying method according to claim 22, further comprising detecting the thickness of an original document from which an image is to be read, wherein said original document thickness detection step including:
  causing the emission of a light-emitting element for detecting the thickness of the original document;
  detecting the thickness of the original document;
  extracting a predetermined pixel group including a pixel associated with the light-emitting element for detecting the thickness of the original document;
  determining whether an output value of the pixel group extracted at the pixel extraction step is in the excess of a preset threshold or not; and
  determining the thickness of the original document from which an image is to be read based on the result of the determination at the threshold determination step.

25. An image copying method according to claim 21, wherein said original document thickness detection includes:
  causing the emission of a light-emitting element for detecting the thickness of the original document;
  receiving the light radiated by the light-emitting element for detecting the thickness of the original document;
  extracting a predetermined pixel group including a pixel associated with the light-emitting element for detecting the thickness of the original document;
  determining whether an output value of the pixel group extracted at the pixel extraction step is in the excess of a preset threshold or not; and
  determining the thickness of the original document from which an image is to be read based on the result of the determination at the threshold determination step.

* * * * *